US010364598B2

(12) United States Patent
Tazbaz et al.

(10) Patent No.: US 10,364,598 B2
(45) Date of Patent: Jul. 30, 2019

(54) HINGED DEVICE

(71) Applicant: Microsoft Technology Licensing, LLC, Redmond, WA (US)

(72) Inventors: Errol Mark Tazbaz, Bellevue, WA (US); David Otto Whitt, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/256,302

(22) Filed: Sep. 2, 2016

(65) Prior Publication Data

US 2018/0066465 A1 Mar. 8, 2018

(51) Int. Cl.
*E05D 3/06* (2006.01)
*E05D 3/12* (2006.01)
(Continued)

(52) U.S. Cl.
CPC ...... *E05D 11/1007* (2013.01); *E05D 11/1064* (2013.01); *G06F 1/1618* (2013.01);
(Continued)

(58) Field of Classification Search
CPC ............... Y10T 16/547; Y10T 16/5474; Y10T 16/5475; Y10T 16/541; Y10T 16/54038;
(Continued)

(56) References Cited

U.S. PATENT DOCUMENTS 2,040,279 A 5/1936 Joseph
3,289,877 A 12/1966 Wolf Hans
(Continued)

FOREIGN PATENT DOCUMENTS

CN 1180516 A 12/2004
CN 103291737 A 9/2013
(Continued)

OTHER PUBLICATIONS

"Computex: Asus Transformer Book Flip series launched with 360 degree hinge", published Jun. 3, 2014, retrieved at <<http://tech.firstpost.com/news-analysis/computex-asus-transformer-book-flip-series-launched-with-360-degree-hinge-225064.html>> on Aug. 16, 2016, 4 pages.
(Continued)

*Primary Examiner* — Chuck Y Mah
(74) *Attorney, Agent, or Firm* — Rainier Patents, P.S.

(57) ABSTRACT

The description relates to devices, such as computing devices that have hinged portions. One example can include a first portion and a second portion. The first portion can define a first hinge axis and can be resiliently biased toward the first hinge axis. The second portion can define a second hinge axis and can be resiliently biased toward the second hinge axis. A first cam can operate relative to the first hinge axis and is slidably secured to the first portion. A second cam can operate relative to the second hinge axis and can be slidably secured to the first portion. When the first and second portions are oriented at an acute angle the second cam can force the second portion away from the second hinge axis while the first cam can allow the first portion to remain biased toward the first hinge axis.

23 Claims, 31 Drawing Sheets

(51) Int. Cl.
*E05D 11/10* (2006.01)
*G06F 1/16* (2006.01)
*H04M 1/02* (2006.01)

(52) U.S. Cl.
CPC .......... *G06F 1/1681* (2013.01); *H04M 1/022* (2013.01); *E05D 3/12* (2013.01); *E05Y 2900/606* (2013.01); *H04M 2250/16* (2013.01)

(58) Field of Classification Search
CPC ...... G06F 1/168; G06F 1/1681; G06F 1/1616; G06F 1/1618; G06F 1/547; E05Y 2900/602; E05Y 2900/606; H04M 1/022; E05D 3/12; E05D 3/122; E05D 11/06; E05D 11/1014; E05D 11/1007
See application file for complete search history.

(56) References Cited

U.S. PATENT DOCUMENTS

| | | |
|---|---|---|
| 4,493,316 A | 1/1985 | Reed |
| 4,617,699 A | 10/1986 | Nakamura |
| 4,718,127 A | 1/1988 | Rittmann et al. |
| 4,753,331 A | 6/1988 | Dietenberger et al. |
| 4,845,809 A | 7/1989 | Pillifant, Jr. |
| 4,949,427 A | 8/1990 | Keller |
| 4,976,007 A | 12/1990 | Lam |
| 4,986,763 A | 1/1991 | Boyle |
| 4,996,739 A | 3/1991 | Baer |
| 5,041,818 A | 8/1991 | Liu |
| 5,173,686 A | 12/1992 | Fujihara |
| 5,229,921 A | 7/1993 | Bohmer |
| 5,448,799 A | 9/1995 | Stein, Jr. |
| 5,509,590 A | 4/1996 | Medeiros, Jr. |
| 5,566,048 A | 10/1996 | Esterberg |
| 5,606,774 A | 3/1997 | Wu |
| 5,640,690 A | 6/1997 | Kudrna |
| 5,666,694 A | 9/1997 | Slow et al. |
| 5,796,576 A | 8/1998 | Kim |
| 5,987,704 A | 11/1999 | Tang |
| 5,995,373 A | 11/1999 | Nagai |
| 6,108,868 A | 8/2000 | Lin |
| 6,223,393 B1 | 5/2001 | Knopf |
| 6,301,489 B1 | 10/2001 | Winstead |
| 6,416,027 B1 | 7/2002 | Hart |
| 6,421,235 B2 | 7/2002 | Ditzik |
| 6,577,496 B1 | 6/2003 | Gioscia et al. |
| 6,628,244 B1 | 9/2003 | Hirosawa |
| 6,766,561 B1 | 7/2004 | Cheng |
| 6,778,381 B1 | 8/2004 | Bolognia et al. |
| 6,813,143 B2 | 11/2004 | Makela |
| 6,925,684 B2 | 8/2005 | Kang |
| 7,058,433 B2 | 6/2006 | Carpenter |
| 7,127,776 B2 | 10/2006 | Park |
| 7,155,266 B2 | 12/2006 | Stefansen |
| 7,266,864 B2 | 9/2007 | Kim |
| 7,293,380 B2 | 11/2007 | Repecki |
| 7,328,481 B2 | 2/2008 | Barnett |
| 7,345,872 B2 | 3/2008 | Wang |
| 7,380,312 B2 | 6/2008 | Ge et al. |
| 7,407,202 B2 | 8/2008 | Ye et al. |
| 7,414,834 B2 | 8/2008 | Ukonaho et al. |
| 7,418,766 B2 | 9/2008 | Nelson et al. |
| 7,436,674 B2 | 10/2008 | Barsun et al. |
| 7,515,406 B2 | 4/2009 | Kee |
| 7,515,707 B2 | 4/2009 | Ka et al. |
| 7,584,524 B2 | 9/2009 | Hung |
| 7,596,358 B2 | 9/2009 | Takagi |
| 7,596,395 B2 | 9/2009 | Gartrell |
| 7,636,985 B2 | 12/2009 | Greenbank |
| 7,753,331 B2 | 7/2010 | Tang |
| 7,758,082 B2 | 7/2010 | Weigel et al. |
| 7,832,056 B2 | 11/2010 | Kuwajima et al. |
| 7,900,323 B2 | 3/2011 | Lin |
| 7,936,559 B2 | 5/2011 | Chen |
| 7,966,694 B2 | 6/2011 | Estlander |
| 7,966,698 B2 | 6/2011 | Barnett |
| 8,032,988 B2 | 10/2011 | Lai et al. |
| 8,050,021 B2 | 11/2011 | Grady et al. |
| 8,122,970 B2 | 2/2012 | Palen |
| 8,170,630 B2 * | 5/2012 | Murayama ............ H04M 1/022 16/330 |
| 8,405,978 B2 | 3/2013 | Okutsu |
| 8,441,791 B2 | 5/2013 | Bohn et al. |
| 8,451,601 B2 | 5/2013 | Bohn et al. |
| 8,474,101 B2 | 7/2013 | Wang et al. |
| 8,498,100 B1 | 7/2013 | Whit et al. |
| 8,522,401 B2 | 9/2013 | Jin |
| 8,578,561 B2 | 11/2013 | Chuang |
| 8,615,848 B2 | 12/2013 | Mitsui |
| 8,624,844 B2 | 1/2014 | Behar et al. |
| 8,638,546 B2 | 1/2014 | Hoshino |
| 8,649,166 B2 | 2/2014 | Wu et al. |
| 8,665,382 B1 | 3/2014 | Sugimoto et al. |
| 8,687,354 B2 * | 4/2014 | Uchiyama ................ E05D 3/12 16/330 |
| 8,713,759 B2 | 5/2014 | Cai |
| 8,776,319 B1 | 7/2014 | Chang et al. |
| 8,780,570 B2 | 7/2014 | Bohn et al. |
| 8,787,016 B2 | 7/2014 | Rothkopf et al. |
| 8,804,324 B2 | 8/2014 | Bohn et al. |
| 8,826,495 B2 | 9/2014 | Jauvtis et al. |
| 8,833,554 B2 | 9/2014 | Busri |
| 8,854,834 B2 | 10/2014 | O'Connor et al. |
| 8,855,726 B2 | 10/2014 | Ozawa |
| 8,875,349 B2 | 11/2014 | Hanigan |
| 8,908,364 B2 | 12/2014 | Tseng et al. |
| 8,908,365 B2 | 12/2014 | Walters et al. |
| 8,923,934 B2 | 12/2014 | Chol et al. |
| 8,938,856 B1 | 1/2015 | Shin et al. |
| 8,959,714 B2 | 2/2015 | Hsu |
| 8,971,029 B2 | 3/2015 | Wong et al. |
| 8,978,206 B2 | 3/2015 | Hsu et al. |
| 8,982,542 B2 | 3/2015 | Bohn |
| 8,988,876 B2 | 3/2015 | Corbin |
| 9,003,607 B1 | 4/2015 | Hsu |
| 9,009,919 B1 | 4/2015 | Chiang |
| 9,013,867 B2 | 4/2015 | Becze |
| 9,014,381 B2 | 4/2015 | Quan et al. |
| 9,069,531 B2 | 6/2015 | Bohn et al. |
| 9,103,147 B1 | 8/2015 | Chuang |
| 9,104,381 B2 | 8/2015 | Kuramochi |
| 9,122,455 B2 | 9/2015 | Meyers |
| 9,185,815 B2 | 11/2015 | Hsu |
| 9,201,464 B2 | 12/2015 | Uchiyama et al. |
| 9,243,432 B2 | 1/2016 | Lee |
| 9,290,976 B1 * | 3/2016 | Horng ................... G06F 1/1618 |
| 9,310,850 B2 | 4/2016 | Hsu |
| 9,317,243 B2 | 4/2016 | Becze |
| 9,348,450 B1 | 5/2016 | Kim |
| 9,371,676 B2 | 6/2016 | Rittenhouse |
| 9,411,365 B1 | 8/2016 | Tanner |
| 9,417,663 B2 | 8/2016 | Kinoshita et al. |
| 9,430,000 B2 | 8/2016 | Hood, III et al. |
| 9,500,013 B2 | 11/2016 | Senatori |
| 9,507,388 B1 | 11/2016 | Hampton et al. |
| 9,513,672 B2 | 12/2016 | Garelli et al. |
| 9,523,226 B1 | 12/2016 | Lam et al. |
| 9,524,000 B2 | 12/2016 | Hsu et al. |
| 9,569,002 B2 | 2/2017 | Walker |
| 9,600,036 B2 | 3/2017 | Uchiyama et al. |
| 9,624,703 B1 | 4/2017 | Lin |
| 9,625,947 B2 | 4/2017 | Lee et al. |
| 9,625,953 B2 | 4/2017 | Bitz et al. |
| 9,625,954 B2 | 4/2017 | Campbell et al. |
| 9,684,343 B2 | 6/2017 | Tazbaz |
| 9,714,533 B2 | 7/2017 | Kuramochi |
| 10,227,808 B2 | 3/2019 | Kabir et al. |
| 10,241,548 B2 | 3/2019 | Mark et al. |
| 10,253,804 B2 | 4/2019 | Daniel et al. |
| 2002/0147026 A1 | 10/2002 | Hsieh |
| 2003/0179880 A1 | 9/2003 | Pan et al. |
| 2004/0091101 A1 | 5/2004 | Park |
| 2004/0212956 A1 | 10/2004 | Kuivas et al. |

(56) References Cited

U.S. PATENT DOCUMENTS

| | | |
|---|---|---|
| 2004/0226138 A1 | 11/2004 | Harmon et al. |
| 2004/0266239 A1 | 12/2004 | Kurokawa |
| 2005/0018393 A1 | 1/2005 | Kuo |
| 2005/0122671 A1 | 6/2005 | Homer |
| 2005/0148375 A1 | 7/2005 | Deline |
| 2005/0155182 A1 | 7/2005 | Han et al. |
| 2005/0239520 A1 | 10/2005 | Stefansen |
| 2006/0005356 A1 | 1/2006 | Amami et al. |
| 2006/0007648 A1 | 1/2006 | Wang |
| 2006/0046792 A1 | 3/2006 | Hassemer et al. |
| 2006/0059659 A1 | 3/2006 | Kim |
| 2006/0133052 A1 | 6/2006 | Harmon et al. |
| 2006/0179612 A1 | 8/2006 | Oshima et al. |
| 2007/0101541 A1 | 5/2007 | Yin et al. |
| 2007/0117600 A1 | 5/2007 | Robertson et al. |
| 2008/0112113 A1 | 5/2008 | Sawadski et al. |
| 2008/0174089 A1 | 7/2008 | Ekberg |
| 2008/0184530 A1 | 8/2008 | Chao |
| 2008/0239672 A1 | 10/2008 | Ghoshal |
| 2008/0250604 A1 | 10/2008 | Chen et al. |
| 2009/0070961 A1 | 3/2009 | Chung et al. |
| 2009/0104949 A1 | 4/2009 | Sato et al. |
| 2009/0291719 A1 | 11/2009 | Christensen |
| 2010/0205777 A1 | 8/2010 | Kim |
| 2010/0207844 A1 | 8/2010 | Manning |
| 2010/0232100 A1 | 9/2010 | Fukuma et al. |
| 2010/0328250 A1 | 12/2010 | Gorsica et al. |
| 2011/0099756 A1* | 5/2011 | Chen .................... G06F 1/1618 16/297 |
| 2011/0115713 A1 | 5/2011 | Altman |
| 2011/0128216 A1 | 6/2011 | Renwick |
| 2011/0177850 A1 | 7/2011 | Griffin et al. |
| 2011/0205695 A1 | 8/2011 | Hassermer et al. |
| 2011/0292605 A1 | 12/2011 | Chen |
| 2012/0002360 A1 | 1/2012 | Seo et al. |
| 2012/0037047 A1 | 2/2012 | Moldovan |
| 2012/0046076 A1* | 2/2012 | Masser .................. G06F 1/1616 455/566 |
| 2012/0120618 A1* | 5/2012 | Bohn .................... G06F 1/1681 361/749 |
| 2012/0120627 A1* | 5/2012 | O'Connor et al. ... G06F 1/1641 361/807 |
| 2012/0127471 A1* | 5/2012 | Urushidani .......... G02B 26/001 356/450 |
| 2012/0137471 A1 | 6/2012 | Kujala |
| 2012/0162866 A1 | 6/2012 | Bohn et al. |
| 2012/0170243 A1 | 7/2012 | Griffin et al. |
| 2012/0206864 A1 | 8/2012 | Bohn et al. |
| 2012/0206893 A1* | 8/2012 | Bohn .................... H04M 1/022 361/807 |
| 2012/0257368 A1 | 10/2012 | Bohn et al. |
| 2012/0307472 A1* | 12/2012 | Bohn .................... G06F 1/1616 361/807 |
| 2012/0314399 A1 | 12/2012 | Bohn |
| 2012/0314400 A1 | 12/2012 | Bohn et al. |
| 2013/0010405 A1 | 1/2013 | Rothkopf et al. |
| 2013/0016489 A1 | 1/2013 | Yeh et al. |
| 2013/0016492 A1 | 1/2013 | Wang et al. |
| 2013/0046492 A1* | 2/2013 | Westergaard ............. H02J 3/00 702/60 |
| 2013/0111704 A1* | 5/2013 | Mitsui .................. H04M 1/022 16/250 |
| 2013/0135809 A1* | 5/2013 | Uchiyama ............ G06F 1/1681 361/679.09 |
| 2013/0139355 A1 | 6/2013 | Lee |
| 2013/0152342 A1 | 6/2013 | Ahn |
| 2013/0318746 A1* | 12/2013 | Kuramochi ........... G06F 1/1681 16/342 |
| 2013/0322004 A1 | 12/2013 | Park |
| 2013/0342094 A1 | 12/2013 | Walters et al. |
| 2014/0042293 A1* | 2/2014 | Mok .................... G06F 1/1652 248/682 |
| 2014/0126133 A1* | 5/2014 | Griffin .................. G06F 1/1652 361/679.27 |
| 2014/0129739 A1 | 5/2014 | King |
| 2014/0174227 A1 | 6/2014 | Hsu et al. |
| 2014/0185215 A1 | 7/2014 | Whitt et al. |
| 2014/0185220 A1 | 7/2014 | Whitt et al. |
| 2014/0196253 A1 | 7/2014 | Song et al. |
| 2014/0217875 A1 | 8/2014 | Park et al. |
| 2014/0246354 A1* | 9/2014 | Probst .................. G06F 1/1616 206/756 |
| 2014/0265295 A1 | 9/2014 | Rhyner et al. |
| 2014/0287804 A1 | 9/2014 | Bohn et al. |
| 2014/0290008 A1* | 10/2014 | Hsu .......................... E05D 3/06 16/386 |
| 2014/0290009 A1* | 10/2014 | Kasai ...................... E05D 3/12 16/386 |
| 2014/0293534 A1 | 10/2014 | Siddiqui |
| 2014/0360296 A1* | 12/2014 | Hsu ....................... G06F 1/1616 74/98 |
| 2014/0362507 A1 | 12/2014 | Kinoshita et al. |
| 2014/0373338 A1 | 12/2014 | O'Connor et al. |
| 2015/0016040 A1* | 1/2015 | Hood ....................... E05D 7/00 361/679.27 |
| 2015/0020351 A1 | 1/2015 | Lin |
| 2015/0092337 A1 | 4/2015 | Tan et al. |
| 2015/0153787 A1* | 6/2015 | Mok .................... G06F 1/1652 361/679.27 |
| 2015/0154437 A1 | 6/2015 | Aoki et al. |
| 2015/0176317 A1 | 6/2015 | Lee |
| 2015/0184437 A1 | 7/2015 | Wikander et al. |
| 2015/0227175 A1* | 8/2015 | Motosugi .............. G06F 1/1681 16/341 |
| 2015/0241978 A1 | 8/2015 | Lombardi et al. |
| 2015/0267450 A1 | 9/2015 | Chiang |
| 2015/0277506 A1 | 10/2015 | Cheah et al. |
| 2015/0309539 A1 | 10/2015 | Kamphuis et al. |
| 2015/0345195 A1 | 12/2015 | Park |
| 2015/0361696 A1* | 12/2015 | Tazbaz .................. H04M 1/022 361/679.27 |
| 2015/0362956 A1 | 12/2015 | Tazbaz |
| 2015/0362958 A1 | 12/2015 | Shang |
| 2016/0041589 A1 | 2/2016 | Tazbaz |
| 2016/0070310 A1 | 3/2016 | Holung et al. |
| 2016/0083988 A1 | 3/2016 | Hsu |
| 2016/0109908 A1 | 4/2016 | Siddiqui |
| 2016/0132075 A1 | 5/2016 | Tazbaz |
| 2016/0132076 A1 | 5/2016 | Bitz et al. |
| 2016/0147267 A1 | 5/2016 | Campbell et al. |
| 2016/0153222 A1 | 6/2016 | Hu |
| 2016/0187934 A1 | 6/2016 | Lee et al. |
| 2016/0187935 A1 | 6/2016 | Tazbaz et al. |
| 2016/0201367 A1 | 7/2016 | Kato |
| 2016/0215541 A1 | 7/2016 | Tazbaz et al. |
| 2016/0224072 A1* | 8/2016 | Huang .................... E05D 7/06 |
| 2016/0266615 A1 | 9/2016 | Uchiyama et al. |
| 2016/0299537 A1 | 10/2016 | Whitt et al. |
| 2016/0326786 A1 | 11/2016 | Lee |
| 2016/0357226 A1 | 12/2016 | Campbell et al. |
| 2017/0017273 A1 | 1/2017 | Weldon et al. |
| 2017/0090523 A1 | 3/2017 | Tazbaz et al. |
| 2017/0145724 A1 | 5/2017 | Siddiqui |
| 2017/0145725 A1 | 5/2017 | Siddiqui |
| 2018/0059735 A1 | 3/2018 | Tazbaz et al. |
| 2018/0164855 A1 | 6/2018 | Tazbaz et al. |
| 2018/0166842 A1 | 6/2018 | Siddiqui |
| 2018/0209473 A1 | 7/2018 | Park et al. |
| 2018/0230724 A1 | 8/2018 | Lin et al. |
| 2018/0292860 A1 | 10/2018 | Siddiqui |
| 2018/0356858 A1 | 12/2018 | Siddiqui et al. |
| 2018/0363341 A1 | 12/2018 | Siddiqui et al. |
| 2019/0094917 A1 | 3/2019 | Schmelzle et al. |

FOREIGN PATENT DOCUMENTS

| | | |
|---|---|---|
| CN | 203376667 U | 1/2014 |
| CN | 104331124 A | 2/2015 |
| CN | 204610543 U | 9/2015 |
| EP | 0928092 A2 | 7/1999 |
| EP | 1422593 A1 | 5/2004 |
| EP | 2466420 A1 | 6/2012 |

(56) References Cited

FOREIGN PATENT DOCUMENTS

| EP | 2528307 A1 | 11/2012 |
|---|---|---|
| EP | 2797296 A2 | 10/2014 |
| GB | 2008940 A | 6/1979 |
| JP | 2006112523 A | 4/2006 |
| WO | 2007/072124 A1 | 6/2007 |
| WO | 2010/076639 A2 | 7/2010 |
| WO | 2010/093139 A2 | 8/2010 |
| WO | 2015/073020 A1 | 5/2015 |
| WO | 2015/147885 A1 | 10/2015 |
| WO | 2015/179257 A1 | 11/2015 |
| WO | 2017087343 A1 | 5/2017 |

OTHER PUBLICATIONS

"Double geared hinge", retrieved at <<http://www.wamungo.com/PrintModel/Detail/Double-geared-hinge-5305a74589702816c05dlab5>>, on Mar. 10, 2017, 6 pages.

"Acer Unveils Industry's First Convertible Chromebook with 13-inch Display," Aug. 31, 2016, retrieved at <<http:// www.acer.com/ac/en/US/press/2016/202372>>, 2 pages.

Moving Point Hinge-Multipivot Hinge, retrieved at: <<http://websystem.gismo.se/Gismo/files/1029/2.mph%2001%20introduktion.pdf>>on Oct. 9, 2014, 6 pages.

Elliott, Amy-Mae, "9 Nifty Laptop Feet to Keep Your PC Running Cool", published on Jul. 30, 2012, retrieved at <<http://mashable.com/2012/07/30/laptop-feet/, 26 pages.

Non-Final Office Action dated Jul. 17, 2017 from U.S. Appl. No. 14/947,994, 23 pages.

Non-Final Office Action dated Apr. 12, 2016 from U.S. Appl. No. 14/555,184, 32 pages.

Response filed Jun. 29, 2016 to the Non-Final Office Action dated Apr. 12, 2016 from U.S. Appl. No. 14/555,184, 10 pages.

Notice of Allowance dated Jul. 14, 2016 from U.S. Appl. No. 14/555,184, 15 pages.

Corrected Notice of Allowability dated Aug. 4, 2016 from U.S. Appl. No. 14/555,184, 16 pages.

Notice of Allowance dated Oct. 24, 2016 from U.S. Appl. No. 14/555,184, 11 pages.

Corrected Notice of Allowability dated Oct. 31, 2016 from U.S. Appl. No. 14/555,184, 6 pages.

"360 deg Hinge Video," published Jul. 21, 2013, retrieved at <<https://www.youtube.com/watch?v=lhEczMi4nsw>>on 4ugust 17, 2016, 1 page.

Domingo, Joel Santo, "Laptop, Tablet or Both? How to Decide," retrieved from <<http://in.pcmag.com/laptops/64076/feature/laptop-tablet-or-both-how-to-decide>>, published May 1, 2014, 11 pages.

"Special Purpose Hinges (cont.)," published Jan. 4, 2007, retrieved at <<http://hingedummy.info/specialpurposepage2.htm on Aug. 17, 2016, 2 pages.

"ASUS Transformer Book Flip TP200SA 360-Degree Convertible Laptop With Quad-core Processor", published Oct. 18, 2015, retrieved from <<http://www.tipandtrick.net/asus-transformer-book-flip-tp200sa-360-degree-convertible-laptop-full-review/>>on Oct. 26, 2015, 3 pages.

BESTEK® 10Δ-15Δ Laptop/Notebook Cooling Pad Six-level Changeable Stand with Dual 118mm Hydraulic Fan Dual USB 2.0 360 degree Rotatable Base BTCPZ4BL, published Nov. 20, 2014, retrieved from >>http://www. amazon.com/Notebook-Six-level-Changeable-Hydraulic-Rotatable/dp/B00L81F6W0>>on Aug. 31, 2015, 5 pages.

Brown, Mlichael, "Dell targets younger audience with 360-degree laptops and thin, light All-in-One PCs", retrieved from <<http://www.pcworld.com/article/2304649/dell-targets-younger-audience-with-360-degree-laptops-and-thin-light-all-in-one-pcs.htm>>, published Jun. 2, 2014, 7 pages.

"Computex: Asus Transformer Book Flip series launched with 360 Degree Hinge", published Jun. 3, 2014, retrieved from http://tech.firstpost.com/news-analysis/computex-asus-transformer-book-flip-series-launched-with-360-degree-hinge-225064.html on Aug. 28, 2015, 4 pages.

Hinckley et al., "Codex: A Dual Screen Tablet Computer", In Proceedings of the SIGCHI Conference on Human Factors in Computing Systems, Boston, MA, CHI 2009—New Mobile Interactions, Apr. 9, 2009, pp. 1933-1942, 10 pages.

"HP Spectre introduce hybrid x360 laptop, rotate 360 degrees, $900", published Apr. 25, 2015, retrieved from <<http://sharetech.biz/hp-spectre-introduce-hybrid-x360-laptop-rotate-360-%E2%80%8B%E2%80%8Bdegrees-900/>>on Oct. 26, 2015, 4 pages.

Kravitz, Noah, "Kyocera Echo Unboxing—Dual-Screen Android Phone (video)", published Apr. 13, 2011, retrieved from <<http://www.technobuffalo.com/videos/kyocera-echo-unboxing-dual-screen-android-phone-video/ on Oct. 26, 2015, 7 pages.

Pradeep, "HP Announces New Pavilion x360 Convertible Laptop Inspired by Lenovo Yoga, Price Starts At $400", published Feb. 23, 2014, retrieved from <<http://microsoft-news.com/hp-announces-new-pavilion-x360-convertible-laptop-inspired-by-lenovo-yoga-price-starts-at-400/>>on Oct. 26, 2015, 9 pages.

Smith, Dada, "Lenovo's New Flex 3 Convertible Laptops Sport a 360 Degree Hinge", retrieved from http://blog. parts-people.com/2015/05/13/lenovos-new-flex-3-convertible-laptops-sport-a-360-degree-hinge/>>, published May 13, 2015, 2 pages.

Smith, Dada, "Microsoft Helps HP Design New Convertible Spectre x360," published Mar. 3, 2015, retrieved at <<http://blog.parts-people.com/2015/03/03/microsoft-helps-hp-design-ne-convertible-spectre-x360/>>, 1 page.

Smith, Sherri L., "Toshiba Satellite Radius Folds into 5 Different Modes", published May 27, 2014, retrieved at <<http://blog.laptopmag.com/toshiba-satellite-radius-specs-price>>on Sep. 1, 2015, 4 pages.

Villa, Jason de, "iPad mini case review: The best generic case you can get right now", published Jan. 1, 2013, retrieved from http://technoodling.net/ipad-mini-case-review-the-best-generic-case-you-can-get-right-now/>>on Aug. 28, 2015, 12 pages.

Wang, Harry, "The 360 Degrees (and 25,000 Hinge Tests) of Yoga Design," Dec. 5, 2012, retrieved at <<http://blog.lenevo.com/en/blog/the-360-degrees-of-yoga-design>>, 14 pages.

Non-Final Office Action dated Feb. 9, 2017 from U.S. Appl. No. 14/947,740, 35 pages.

Response filed Apr. 13, 2017 to the Non-Final Office Action dated Feb. 9, 2017 from U.S. Appl. No. 14/947,740, 9 pages.

International Search Report and Written Opinion dated Feb. 20, 2017 from PCT Patent Application No. PCT/US2016/061940, 13 pages.

Non-Final Office Action dated Nov. 3, 2016 from U.S. Appl. No. 14/947,994, 25 pages.

Response filed Jan. 11, 2017 to the Non-Final Office Action dated Nov. 3, 2016 from U.S. Appl. No. 14/947,994, 12 pages.

Final Office Action dated Feb. 16, 2017 from U.S. Appl. No. 14/947,994, 13 pages.

Response filed Apr. 3, 2017 to the Final Office Action dated Feb. 16, 2017 from U.S. Appl. No. 14/947,994, 9 pages.

Applicant-Initiated Interview Summary dated Apr. 4, 2017 from U.S. Appl. No. 14/947,994, 3 pages.

International Search Report and Written Opinion dated Feb. 16, 2017 from PCT Patent Application No. PCT/US2016/061942, 12 pages.

Corrected Notice of Allowability dated Nov. 21, 2016 from U.S. Appl. No. 14/555,184, 6 pages.

Preliminary Amendment filed Sep. 26, 2016 from U.S. Appl. No. 15/239,417, 7 pages.

Non-Final Office Action dated May 25, 2017 from U.S. Appl. No. 15/239,417, 71 pages.

Corrected Notice of Allowability dated Dec. 14, 2016 from U.S. Appl. No. 14/555,184, 6 pages.

Notice of Allowance dated Feb. 3, 2017 from U.S. Appl. No. 14/555,184, 18 pages.

Corrected Notice of Allowability dated Mar. 16, 2017 from U.S. Appl. No. 14/555,184, 8 pages.

International Search Report dated Jan. 25, 2016 from PCT Patent Application No. PCT/US2015/060959, 11 pages.

(56) References Cited

OTHER PUBLICATIONS

Article 34 Demand filed Jun. 8, 2016 from PCT Patent Application No. PCT/US2015/060959, 14 pages.
Second Written Opinion dated Oct. 10, 2016 from PCT Patent Application No. PCT/US2015/060959, 7 pages.
Response filed Dec. 7, 2016 to the Second Written Opinion dated Oct. 10, 2016 from PCT Patent Application No. PCT/US2015/060959, 8 pages.
International Preliminary Report on Patentability dated Mar. 3, 2017 from PCT Patent Application No. PCT/US2015/060959, 7 pages.
Martin, Harlan, "Geared Hinge", published on Jan. 27, 2015, retrieved at <<https://www.thingiverse.com/make:116451>>on Aug. 9, 2017, 1 page.
Final Office Action dated Jun. 14, 2017 from U.S. Appl. No. 14/947,740, 25 pages.
Applicant-Initiated Interview Summary dated Aug. 8, 2017 from U.S. Appl. No. 14/947,740, 3 pages.
Response filed Aug. 9, 2017 to the Final Office Action dated Jun. 14, 2017 from U.S. Appl. No. 14/947,740, 9 pages.
Applicant Initiated Interview Summary dated Aug. 15, 2017 from U.S. Appl. No. 15/239,417, 3 pages.
Non-Final Office Action dated Aug. 28, 2017 from U.S. Appl. No. 14/947,740, 21 pages.
Article 34 Amendment and Chapter II Demand filed Jun. 19, 2017 from PCT Patent Application No. PCT/US2016/061940, 21 pages.
Article 34 Amendment and Chapter II Demand filed May 19, 2017 from PCT Patent Application No. PCT/US2016/061942, 14 pages.
Response filed Aug. 23, 2017 to Non-Final Office Action dated May 25, 2017 from U.S. Appl. No. 15/239,417, 9 pages.
Communication pursuant to Rules 161(1) and 162 EPC mailed Jul. 4, 2017 from European Patent Application No. 15801625.3-1972, 2 pages.
Written Opinion dated Sep. 6, 2017 from PCT Patent Application No. PCT/US2016/061940, 9 pages.
Final Office Action dated Nov. 2, 2017 from U.S. Appl. No. 14/947,994, 44 pages.
Written Opinion dated Aug. 24, 2017 from PCT Patent Application No. PCT/US2016/061942, 7 pages.
Final Office Action dated Feb. 5, 2018 from U.S. Appl. No. 14/47,740, 54 pages.

International Report on Patentability dated Jan. 18, 2018 from PCT Patent Application No. PCT/US2016/061942, 8 pages.
International Preliminary Report on Patentability dated Jan. 23, 2018 from PCT Patent Application No. PCT/US2016/061940, 10 pages.
"International Search Report & Written Opinion Issued in PCT Application No. PCT/US2018/013036", dated Apr. 6, 2018, 11 pages.
"International Search Report and Written Opinion issued in PCT Application No. PC/US2017/013687", dated Apr. 21, 2017, 12 Pages.
"Non Final Office Action issued in U.S. Appl. No. 14/947,994", dated Apr. 5, 2018, 28 Pages.
"Non Final Office Action issued in U.S. Appl. No. 15/255,056", dated Sep. 28, 2018, 11 Pages.
"Non Final Office Action Issued in U.S. Appl. No. 15/256,302", dated Jun. 9, 2017, 12 Pages.
"Non Final Office Action issued in U.S. Appl. No. 15/374,594", dated Sep. 19, 2017, 11 Pages.
"Final Office Action issued in U.S. Appl. No. 15/414,432", dated May 17, 2018, 9 Pages.
"Non Final Office Action issued in U.S. Appl. No. 15/414,432", dated Nov. 29, 2017, 10 Pages.
"Notice of Allowance Issued in U.S. Appl. No. 15/618,067", dated May 24, 2018, 8 Pages.
"Notice of Allowance Issued in U.S. Application No. 15/691,524", dated Sep. 24, 2018, 10 Pages.
"International Search Report and Written Opinion issued in PCT Application No. PCT/US18/034245", dated Aug. 13, 2018, 14 pages.
"International Search Report and Written Opinion issued in PCT Application No. PCT/US2017/013591", dated Apr. 21, 2017, 11 Pages.
"International Search Report & Written Opinion Issued in PCT Application No. PCT/US18/034011", dated Nov. 16, 2018, 13 Pages.
"Final Office Action issued in U.S. Appl. No. 15/255,056", dated Apr. 11, 2019, 6 Pages.
"Non Final Office Action issued in U.S. Appl. No. 15/373,966", dated May 15, 2019, 7 Pages.

* cited by examiner

HINGED DEVICE

BRIEF DESCRIPTION OF THE DRAWINGS

The accompanying drawings illustrate implementations of the concepts conveyed in the present document. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the FIG. and associated discussion where the reference number is first introduced.

DETAILED DESCRIPTION

The present concepts relate to devices, such as computing devices employing determinative hinge assemblies that can rotationally secure first and second device portions relative to a first hinge axis that relates to the first portion and a second hinge axis that relates to the second portion. The determinative hinge assembly can define which angles of rotation occur relative to which hinge axis. For instance, 0 to 90 degree rotation may occur around one hinge axis, 91-270 degrees may occur around the other hinge axis, and 271 degrees to 360 degrees may occur around the former hinge axis, for example. Traditionally, at certain angles of rotation, the first and second portions might contact one another. This contact can damage elements of either or both of the first and second portions. The determinative hinge assembly can solve this issue by moving the first and/or second portions away from one another at relative orientations where the contact is likely to occur to lessen and/or avoid this contact and thus avoid damaging contact forces that would otherwise be imparted on the first and second portions.

Figure 1A:
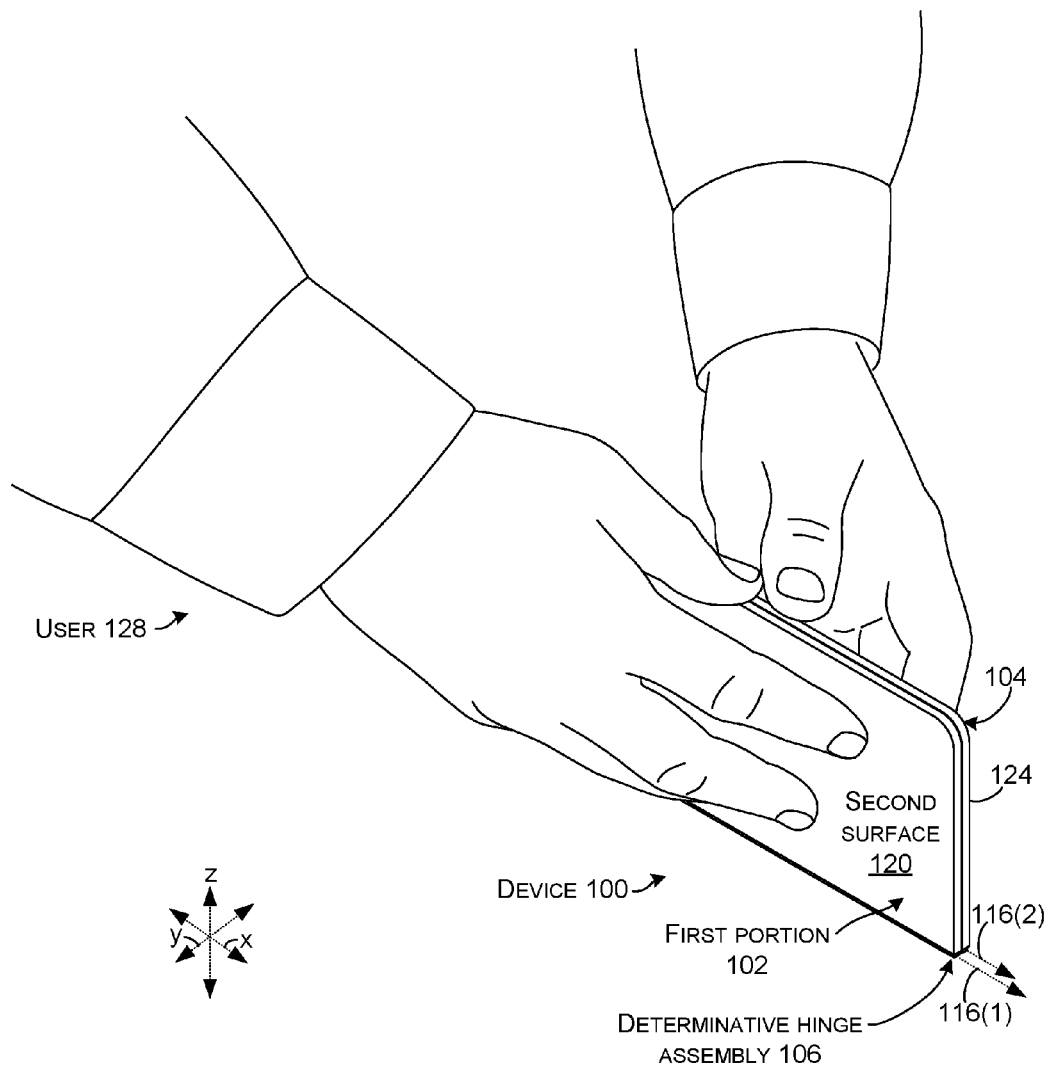
FIGS. 1A, 1B, 1C, 2A, 4A, 5A, 6A, 7A, 8A, 9A, 10A, 11A, and 12A show perspective views of example devices in accordance with some implementations of the present concepts.
Figure 1B:
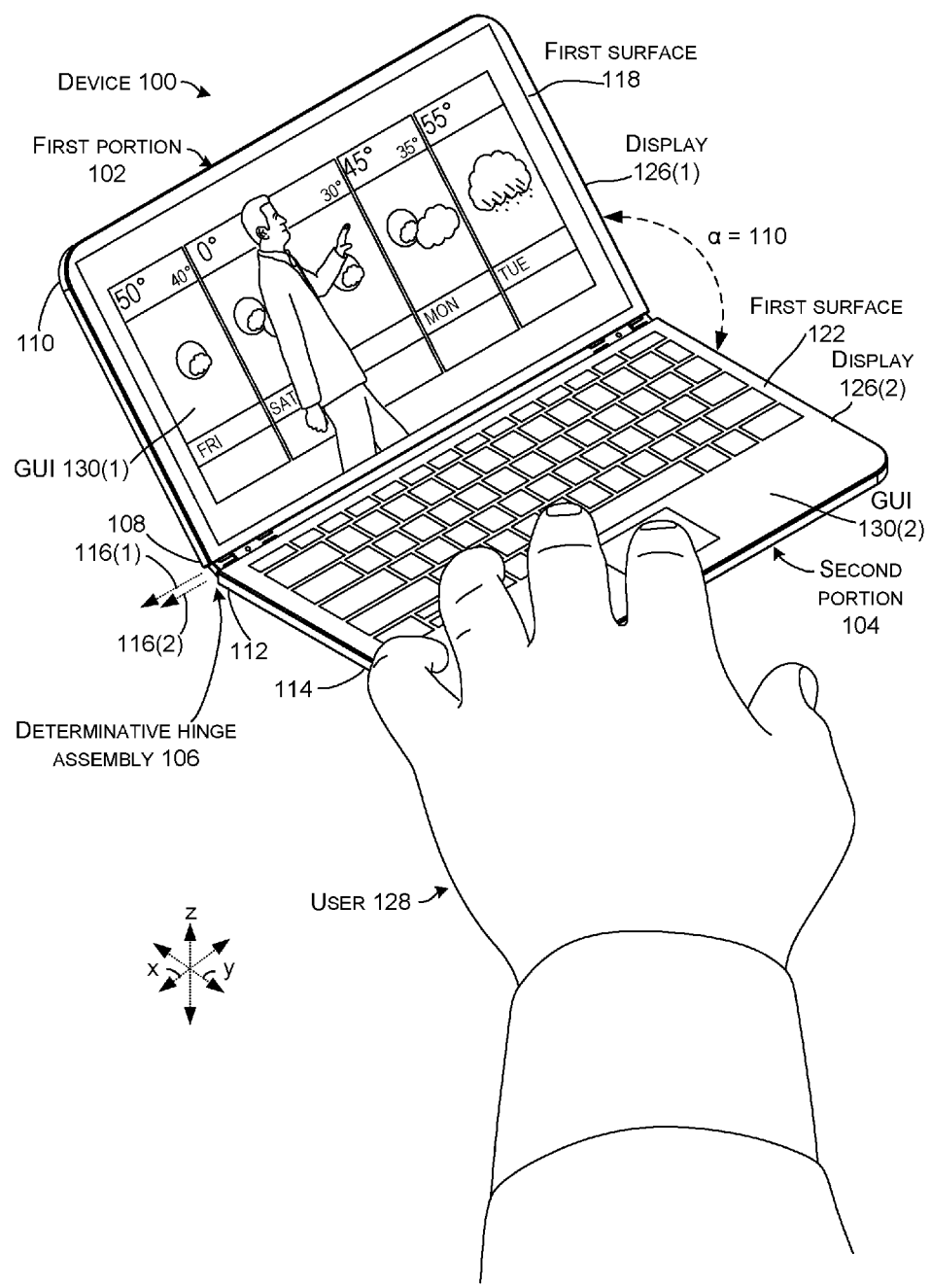
Figure 1C:
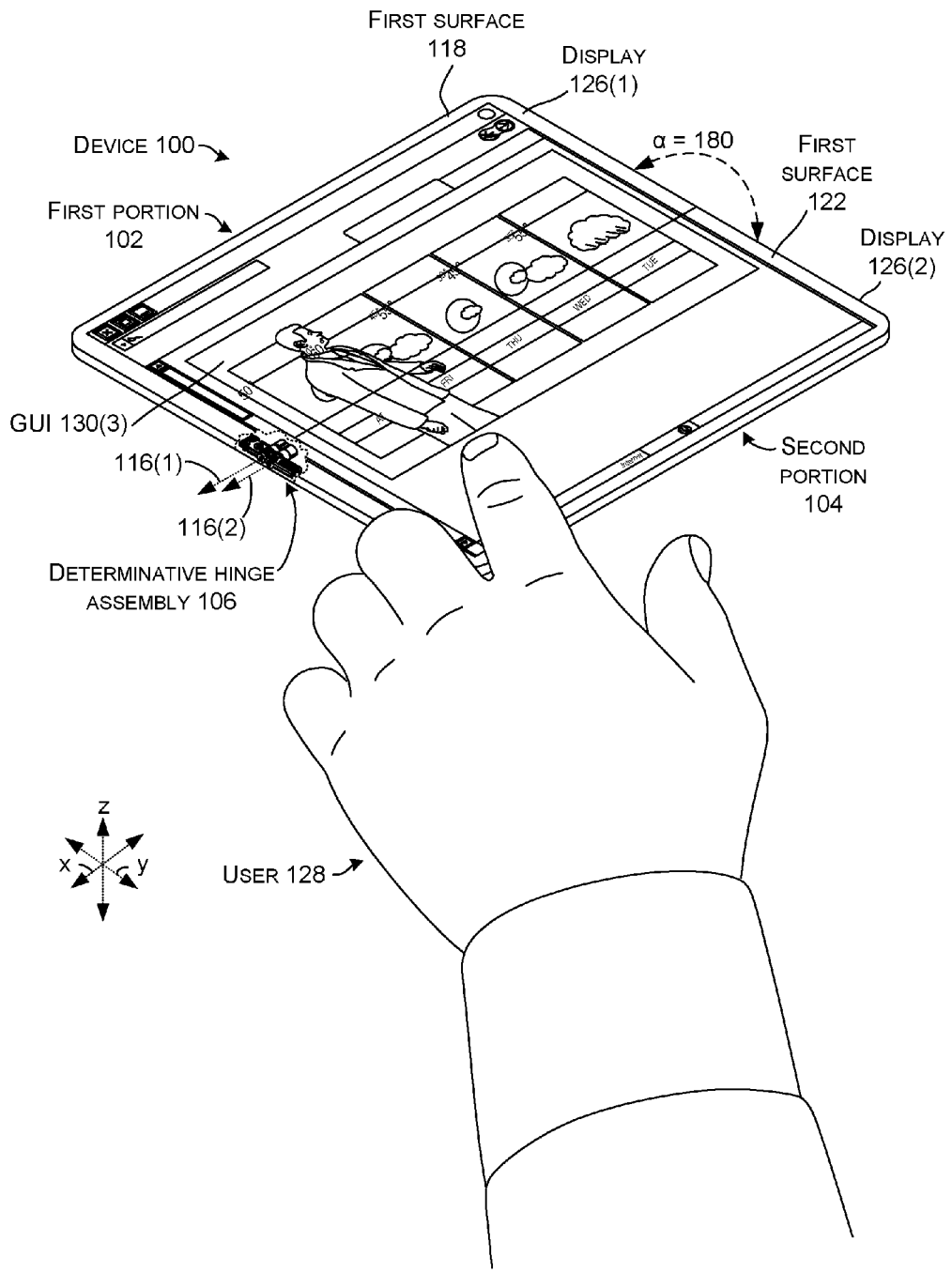

Introductory FIGS. 1A-1C show an example device 100 in a use case scenario. The device 100 can have first and second portions 102 and 104 that are rotatably secured together by a determinative hinge assembly 106 (indicated generally in FIGS. 1A and 1B and shown in cut-away in FIG. 1C). The first portion 102 can extend from a hinge end 108 to a distal end 110. The second portion 104 also can extend from a hinge end 112 to a distal end 114. The determinative hinge assembly 106 can define two hinge axes (e.g., axes of rotation) 116. The first portion 102 can rotate around first hinge axis 116(1) and the second portion 104 can rotate around second hinge axis 116(2). The determinative nature of the determinative hinge assembly 106 can control the relative order of rotation around the two hinge axes 116(1) and 116(2). Stated another way, given a range of rotation (e.g., set of angles) of the first and second portions, the determinative hinge assembly can define sub-ranges or sub-sets of rotation where rotation occurs around a specific hinge axis.

The first portion 102 can include opposing first and second surfaces 118 and 120, which can be parallel to one another. Similarly, the second portion 104 can include opposing first and second surfaces 122 and 124, which can be parallel to one another. In some implementations the first and/or second surfaces 118, 122, 120, and/or 124 can be planar surfaces. In some implementations, displays 126 can be positioned on the first and/or second surfaces. In this case, displays 126(1) and 126(2) are positioned on first surfaces 118 and 122, respectively.

As mentioned, FIGS. 1A-1C collectively show a use case scenario of device 100. FIG. 1A starts with device 100 in the closed orientation where the first and second portions 102 and 104 are positioned against one another and are rotatably secured by determinative hinge assembly 106. In this case, the second surfaces are facing outwardly with the first portion's second surface 120 facing the reader and the first surfaces (designated in FIG. 1B) facing inwardly. The closed orientation can be very compact and easy for a user 128 to transport. For instance, the device may fit in the user's pocket. Further, the first surfaces can be protected in this closed orientation by the second surfaces. The device can be biased to maintain this orientation until acted upon by the user. At this point user 128 is starting to open the device 100 (e.g., rotate the device portions 102 and 104 away from one another).

FIG. 1B shows the device 100 opened to an angle defined between the first and second portions 102 and 104 of about 110 degrees. This orientation can be thought of as a 'notebook' or 'laptop' orientation. The notebook orientation can be manifest as an angle in a range from about 90 degrees to about 150 degrees. In this case, the device portions 102 and 104 are configured to maintain this relative orientation while the user uses the device. In this example, video content is presented on a graphical user interface (GUI) 130(1) on display 126(1) of the first portion 102 and a virtual keyboard is presented on a GUI 130(2) on display 126(2) on second portion 104. The user can control GUI 130(1) via the virtual keyboard of GUI 130(2).

FIG. 1C shows the device 100 rotated until the relative angle is about 180 degrees between the first and second portions 102 and 104. In this orientation, a single GUI 130(3) can be presented collectively across displays 126(1) and 126(2). This GUI 130(3) offers basically twice the display area of either device portion 102 or 104. The GUI 130(3) can be more pleasing to the user when the first and second portions abut one another to make the GUI nearly seamless between the two displays 126(1) and 126(2). When not in use, the user can close the device 100 to a compact easy to carry configuration (e.g., see FIG. 1A) that protects the displays 126 from damage.

Note that while obscured by the displays 126, several electronic components, such as circuit boards, processors, and/or storage/memory can be secured to the first and second portions 102 and/or 104.

The processor can generate the GUIs 130 for presentation on the displays 126. In some implementations, the processor may generate different GUIs for the displays when the first and second portions 102 and 104 are in some orientations and a single GUI for a combined presentation in other orientations. For instance, when the first and second portions are oriented at 90 degrees relative to one another, the processor may generate a first GUI for presentation on the first portion and a second GUI for presentation on the second portion. When the first and second portions are oriented to 180 degrees, the processor can generate a single GUI that is collectively presented across both displays to create a larger display area. In other orientations, such as the alarm clock orientation, the same GUI may be presented on both the first and second portions. For instance, the time could be presented on both portions so that it is visible from more positions around the device. Thus, the processor can control the GUIs based upon the relative angle of the first and second portions.

Stated another way, in some configurations, the first surfaces 118 and 122 can be manifest as displays 126, such that in the open-book orientation of FIG. 1C the displays can work cooperatively to create a larger (e.g., 2x) display area. In some cases, the second surfaces 120 and 124 can be manifest as protective covers so that in the orientation of FIG. 1A the protective covers protect the displays of the first surfaces. In other configurations, both the first and second surfaces can include displays, or neither can include displays.

Figure 2A:
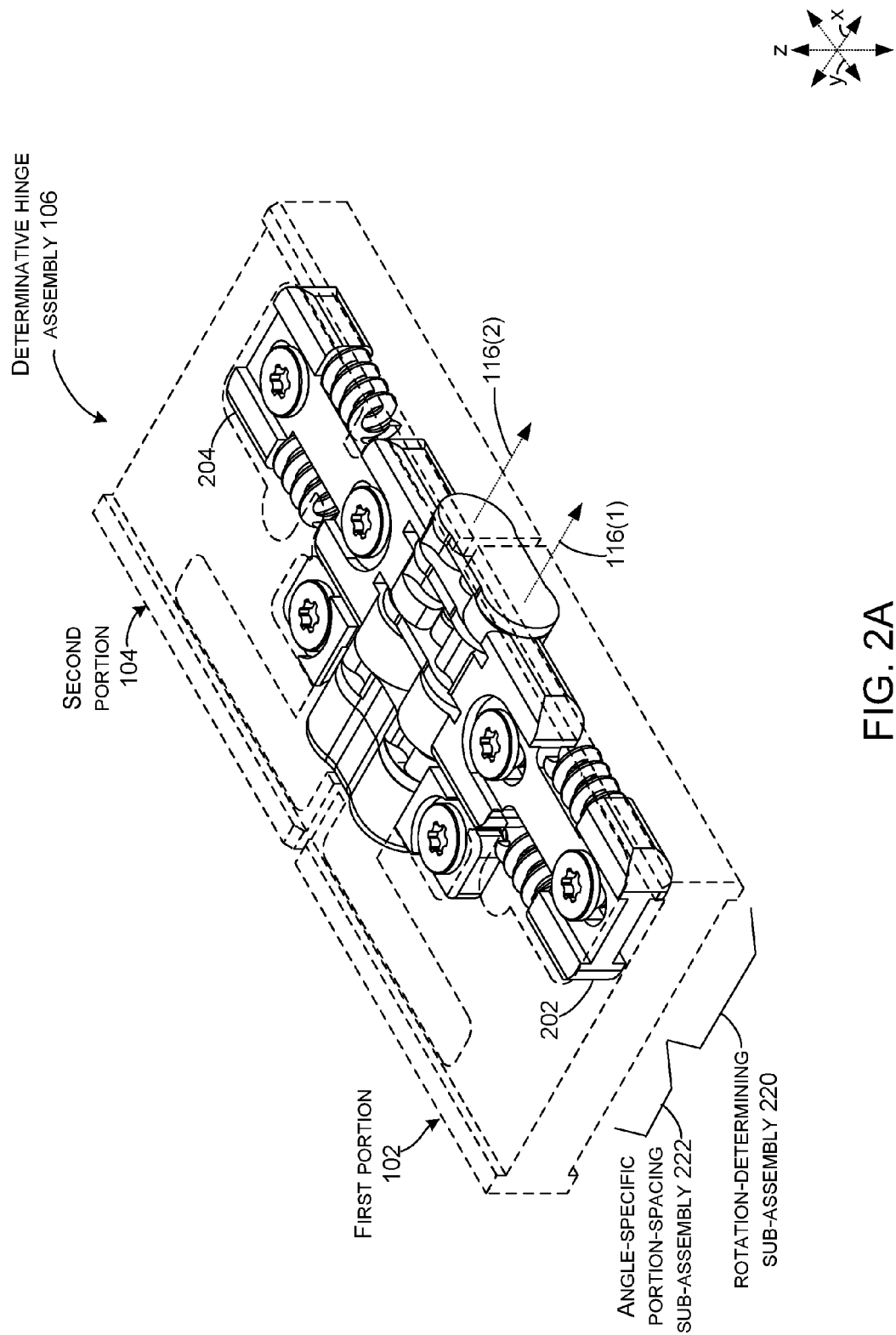
Figure 2B:
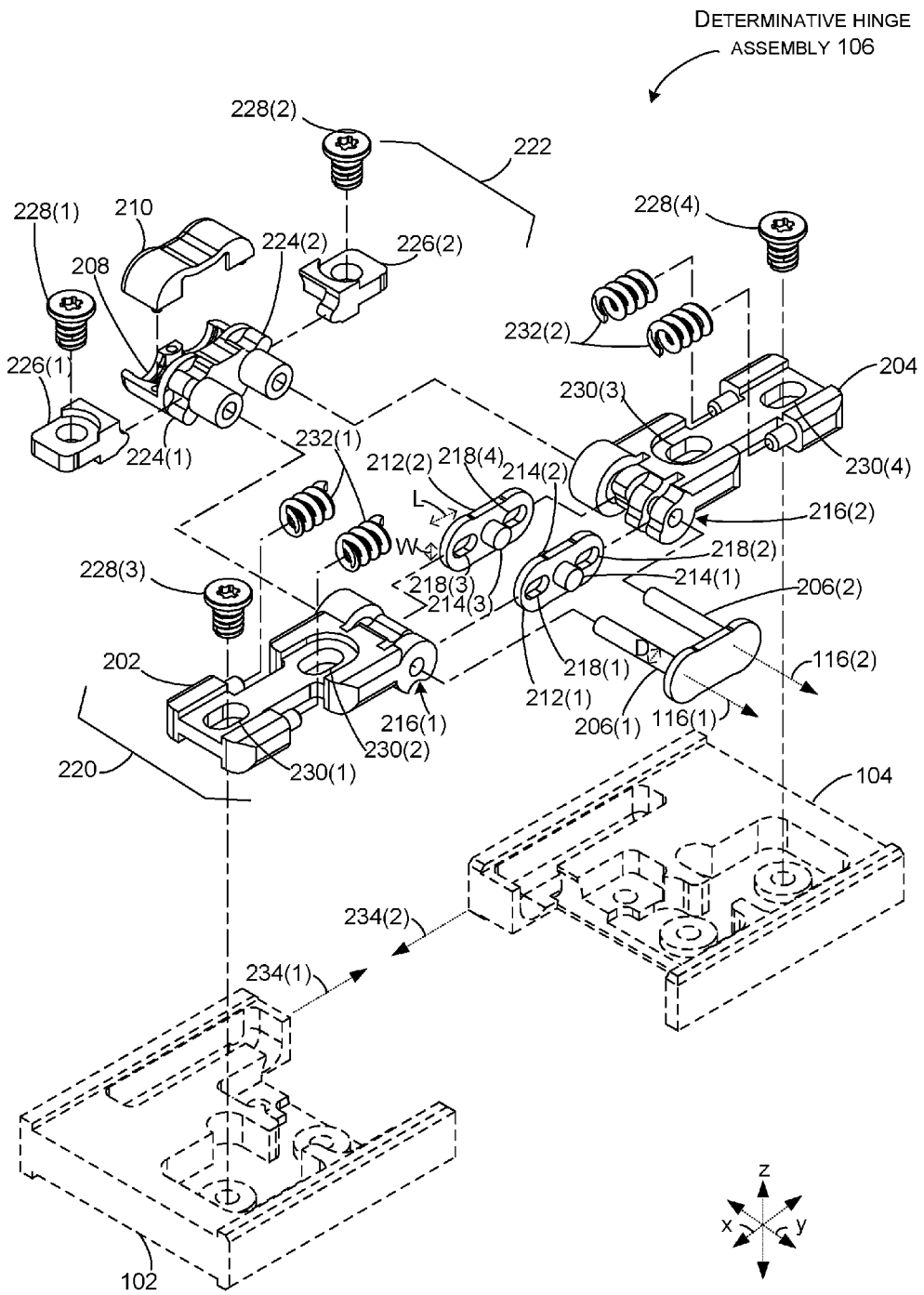
FIG. 2B shows an exploded perspective view of an example device in accordance with some implementations of the present concepts.

FIGS. 2A and 2B show more details of example determinative hinge assembly 106. Determinative hinge assembly 106 can rotate a first body 202 and a second body 204 about axes of rotation (e.g., hinge axes) 116. The first body 202 and the second body 204 can be slidably secured to first and second portions 102 and 104 (FIGS. 1A and 1B), respectively.

Axis of rotation (e.g., hinge axes) 116(1) can be defined by a hinge pin 206(1) associated with a communication member 208 and axis of rotation 116(2) can be defined by another hinge pin 206(2). The communication member 208 can also be associated with a cover 210.

In some implementations, rotation around the first hinge axis 116(1) and/or the second hinge axis 116(2) may be selectively locked and unlocked, such as by the use of sliders 212 and associated followers 214. In this case, followers 214(1) and 214(2) are positioned on slider 212(1) and follower 214(3) is positioned on slider 212(2).

The determinative hinge assembly 106 can include cams 216 associated with the first body 202 and/or the second body 204. In this example, the first body 202 includes three cams 216(1), and the second body 204 includes three cams 216(2). Individual cams are not designated with specificity relative to FIGS. 2A and 2B to avoid clutter on the drawing page, but individual cams are designated and discussed relative to FIGS. 4A-12F. (Note that while not designated with specificity in FIGS. 2A and 2B, cam 216(1) can include three individual cams 216(1)A, 216(1)B, and 216(1)C. Similarly, cam 216(2) can include three opposing cams 216(2)A, 216(2)B, and 216(2)C. These cams engage through intervening cam followers 214(1), 214(2), and 214(3) respectively.)

The cams 216 may have a pattern of low areas and/or high areas to allow or urge an individual follower 214 to move relative to an individual hinge pin 206 during rotation of the determinant hinge assembly 106. This aspect is described in more detail below relative to FIGS. 3A-3D. In some implementations, the opposing cams 216(1) and 216(2) can act directly on one another to lock and unlock rotation around individual hinge axes 116. In other implementations, the cams 216 can act upon an interposed element, such as the followers 214 employed in the illustrated implementation. In this configuration interaction of the cams 216 and the followers 214 can lock and unlock rotation around individual hinge axes.

In this implementation, sliders 212 can includes apertures 218 through which the hinge pins 206 can pass. In the illustrated configuration hinge pin 206(1) passes through aperture 218(1) in slider 212(1) and aperture 218(3) in slider 212(2). Similarly, hinge pin 206(2) passes through aperture 218(2) in slider 212(1) and aperture 218(4) in slider 212(2).

Individual apertures 218 can be elongate such that a width W of the aperture is approximately equal or slightly larger than a diameter D of the received hinge pin 206 while a length L of the aperture is substantially greater than the hinge pin diameter. (In order to reduce clutter on the drawing page, the diameter D, length L, and width W are labeled in only one instance on the drawing page of FIG. 2B). Thus, the apertures 218 can be elongated in a direction to allow the movement of the sliders 212 relative to the hinge pins 206. The extent of movement of the sliders 212 relative to the hinge pins 206 can be at least partially related to the aperture length L. For example, the amount of movement (e.g. stroke) of the sliders 212 (and hence, any followers 214 connected thereto) may be the difference between the aperture length L and the diameter D of the hinge pins 206. In other implementations, the stroke of the sliders can be determined by the cam rise and fall between the two halves of the hinge. The width of the apertures can be slightly larger than the diameter of the hinge pins that go through the apertures. This can ensure a single degree of translational freedom for the sliders 212.

Note that in the illustrated implementation the apertures 218 have approximately equal lengths. In other implementations, the apertures 218(1) and 218(2) of the slider 212(1) can be different lengths from apertures 218(3) and 218(4) of slider 212(2). From one perspective, the sliders 212, followers 214, and cams 216 can control whether rotation at a given relative angle occurs around hinge axis 116(1) or hinge axis 116(2). Thus, the sliders 212, followers 214, and cams 216 can be viewed as a rotation-determining sub-assembly 220.

The determinative hinge assembly 106 can further include an angle-specific portion-spacing sub-assembly 222. The function of the angle-specific portion-spacing sub-assembly 222 can relate to reducing and/or avoiding contact between the first and second device portions 102 and 104 during a range of rotation of the device. In some implementations, angle-specific portion-spacing sub-assembly 222 can include one or more cams 224 and associated cam followers 226. In the illustrated implementation, cams 224(1) and 224(2) are integrated into communication member 208. In other implementations, cams 224 can be freestanding elements.

Cams 224(1) and 224(2) interact with associated cam followers 226(1) and 226(2) that are secured to first portion 102 and second portion 104, respectively by fasteners 228(1) and 228(2). Additional fasteners 228(3) and 228(4) slidably secure the first and second bodies 202 and 204 to the first and second portions 102 and 104 via elongate apertures 230(1) and 230(2) and 230(3) and 230(4), respectively. To avoid clutter on the drawing page, not all fasteners 228 are illustrated. Further, alternative or additional fasteners 228 can be employed.

As mentioned, the first and second bodies 202 and 204 can be slidably secured to the first and second portions 102. Further, the first and/or second bodies 202 and 204 can be resiliently biased relative to the first and second portions 102 and 104 by biasing elements. In this case the biasing elements can be manifest as springs 232. For example, in the illustrated implementation, springs 232 can be positioned between the portions and the bodies. In this example springs 232(1) are positioned between the first portion 102 and the first body 202 and springs 232(2) are positioned between the second portion 104 and the second body 204.

The springs 232 can resiliently bias the first and second portions 102 and 104 toward one another as indicated by arrows 234(1) and 234(2). Viewed another way, the springs can resiliently bias the first and second portions toward their respective hinge axes 116. At individual angles, the angle-specific portion-spacing sub-assembly 222 can overcome this bias and force the first and second portions apart from one another to prevent the two portions from crashing into and damaging one another. This aspect is illustrated and described in more detail below relative to FIGS. 4A-12F.

In some implementations, communication member 208 may have one or more wires and/or cables extending therethrough, or, in other implementations, may provide a direct electrical contact through which the determinative hinge assembly 106 may have electrical communication between the first portion 102 and second portion 104, or electronic components connected thereto. Data and/or electrical communication through the communication member 208 may allow electricity and/or data to be sent across the determinative hinge assembly 106 between, for example, a display 126 (FIG. 1B) connected to the first portion 102 and one or more computing components connected to the second portion 104. In some implementations, the communication member 208 provides electrical communication. In some implementations, the communication member 208 provides electrical and data communication. In yet other implementations, the communication member 208 provides data communication without electrical communication, such as via fiber optic cables.

In other implementations, first and second communication members 208 may be positioned in the determinative hinge assembly 106. The first communication member and second communication member may have one or more wires and/or cables extending between them or, in other implementations, a direct electrical contact between the first communication member and second communication member may allow electrical communication between the first communication member and second communication member. Data and/or electrical communication through the first communication member and second communication member may allow electricity and/or data to be sent across the determinative hinge assembly 106 between, for example, display (126(1), FIG. 1B) connected to the first portion 102 and one or more computing components connected to the second portion 104.

FIGS. 3A-3D show how an example determinative hinge assembly 106X can control when rotation occurs around individual hinge axes 116 (extending into and out of the page in the center of hinge pins 206). (The suffix 'X' is used relative to determinative hinge assembly 106X to convey that components of this determinative hinge assembly may or may not differ from other determinative hinge examples. To avoid clutter on the drawing page the 'X' suffix is not carried through to individual components). In this case, the rotation control is provided by an example rotation-determining sub-assembly 220.

Figure 3A:
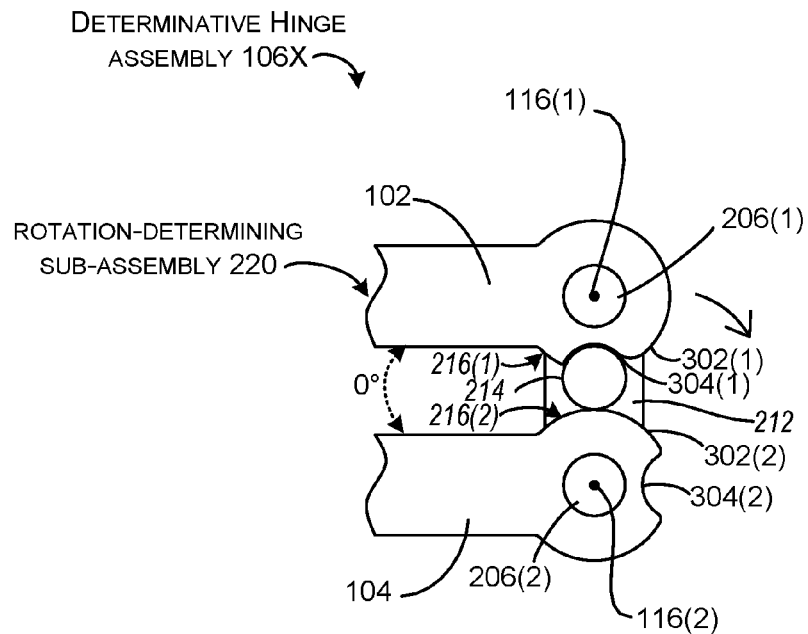
FIGS. 3A-3D, 4C-4F, 5C-5F, 6C-6F, 7C-7F, 8C-8F, 9C-9F, 10C-10F, 11C-11F, and 12C-12F show sectional views of example devices in accordance with some implementations of the present concepts.

FIG. 3A illustrates the determinative hinge assembly 106X in the closed (e.g., zero degree angle between the first and second portions 102 and 104) position. Note that in this implementation, individual cams 216 of the rotation-determining sub-assembly 220 include a 'high' area 302 and a 'low' or recessed area 304. In the closed position, the high area 302(2) of cam 216(2) contacts follower 214 and forces the follower into recessed area 304(1) of cam 216(1). At this point, rotation around first hinge axis 116(1) is blocked because follower 214 cannot move downward (e.g., away from hinge axis 116(1) and toward hinge axis 116(2)) and is instead 'stuck' in the recessed area 304(1). In contrast, rotation around hinge axis 116(2) can occur with follower 214 traveling across high area 302(2).

Figure 3B:
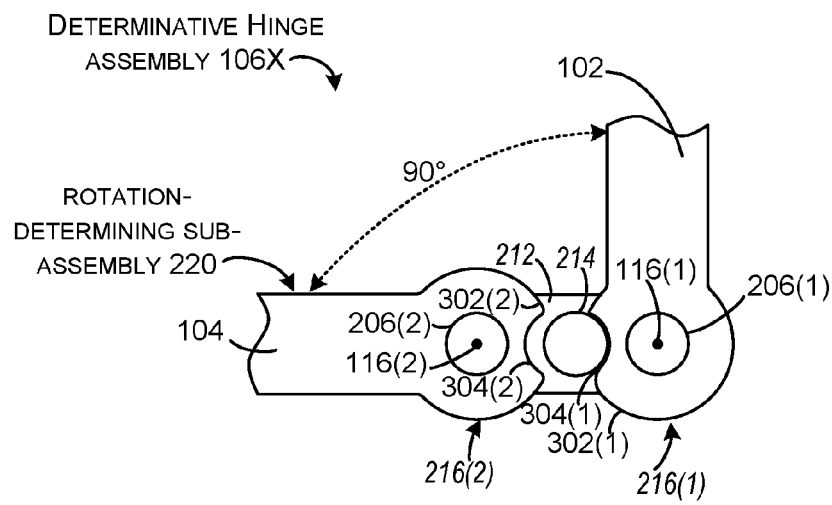

FIG. 3B shows a subsequent orientation of determinative hinge assembly 106X where rotation around the second hinge axis 116(2) has progressed until the angle between the first and second portions 102 and 104 is about 90 degrees. At this point, follower 214 of rotation-determining sub-assembly 220 is proximate to the recessed area 304(1) of cam 216(1) and thus there is space between the follower 214 and cam 216(2).

Figure 3C:
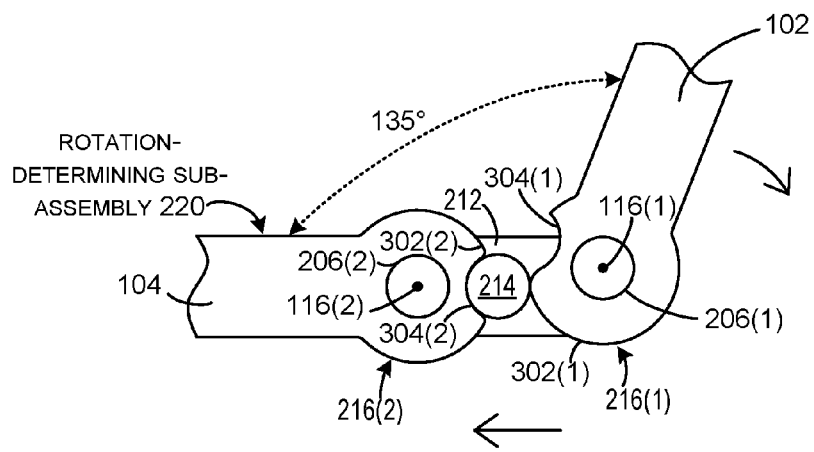

FIG. 3C shows rotation around hinge axis 116(1) rotating contact with follower 214 from recess area 304(1) to high area 302(1). This contact forces the follower away from hinge axis 116(1) and toward hinge axis 116(2) (e.g., into recess area 304(2) of cam 216(2)). As such, at this point, rotation can continue around hinge axis 116(1), but rotation is blocked around hinge axis 116(2).

Figure 3D:
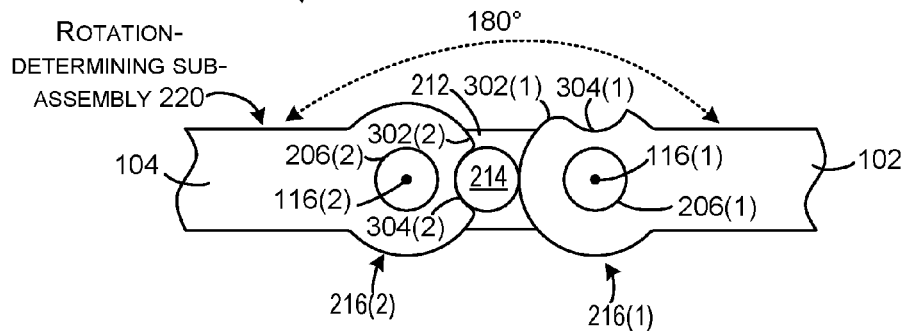

FIG. 3D shows continued rotation around hinge axis 116(1) until the first and second portions 102 and 104 are 180 degrees apart. During this rotation from 135 degrees of FIG. 3C to 180 degrees of FIG. 3D, rotation around hinge axis 116(2) is blocked by follower 214 interacting with recess area 304(2) of cam 216(2) and the follower being locked by cam 216(1). The example sequences shown in FIGS. 3A-3D show how example determinative hinge assembly 106X can control rotation around individual hinge axes for ranges of angles between zero and 180 degrees. Viewed another way, for a first sub-range of the angles, rotation occurs around hinge axis 116(2) while rotation around hinge axis 116(1) is locked and for a second sub-range of angles, rotation occurs around hinge axis 116(1) while rotation around hinge axis 116(2) is locked. While the illustrated example has a range of rotation of 180 degrees, other implementations can control rotation for other ranges of rotation, such as by employing different cam patterns of hinge and recessed areas and or by employing multiple cams, such as one set to control rotation in a first range and another set to control rotation in a different range. Further, while not specifically discussed, these cams and/or additional cams can be used to control rotation in the opposite direction (e.g., from 360 degrees to zero degrees).

Figure 4A:
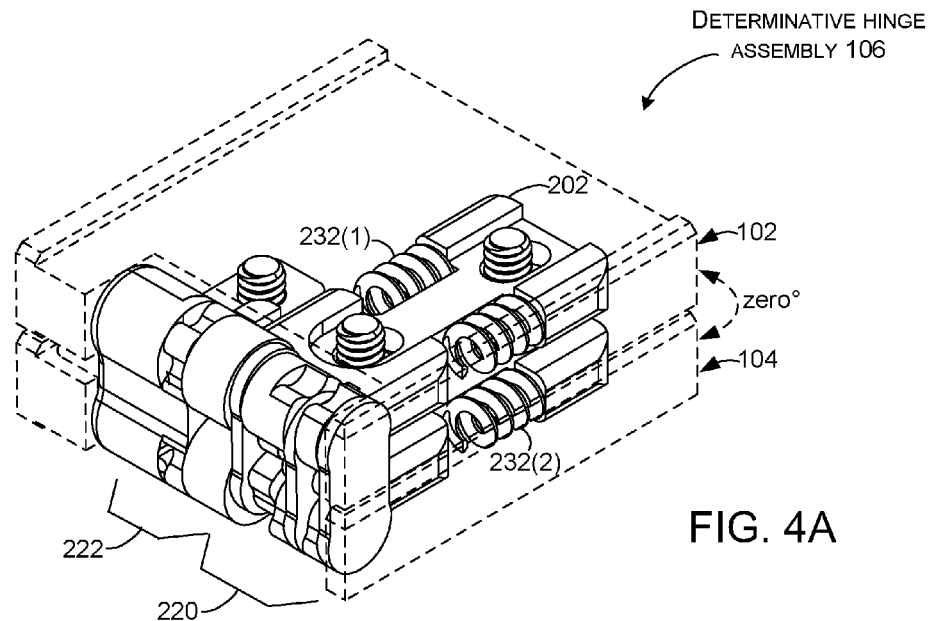
Figure 4B:
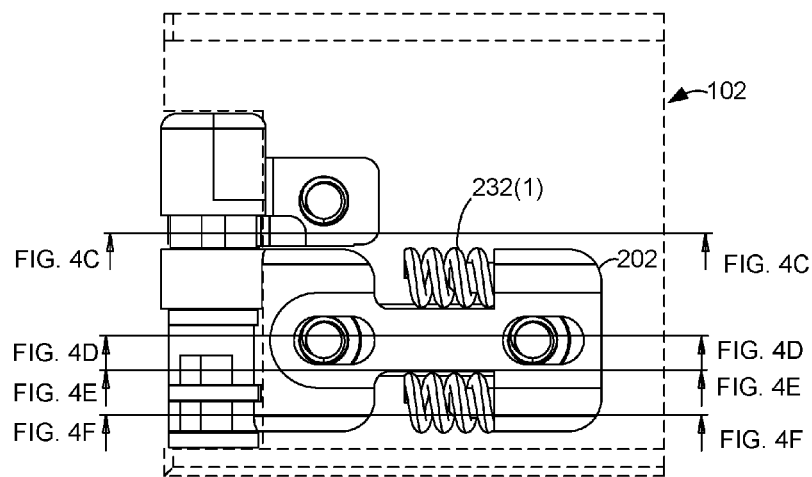
FIGS. 4B, 5B, 6B, 7B, 8B, 9B, 10B, 11B, and 12B show elevational views of example devices in accordance with some implementations of the present concepts.

FIGS. 4A-12D collectively show determinative hinge assembly 106 at specific degrees of relative rotation. These FIGS. collectively show details of how rotation-determining sub-assembly 220 can control rotation around individual axes of rotation (e.g., hinge axes) 116 at individual angles and how angle-specific portion-spacing sub-assembly 222 can reduce contact-induced damage to the device portions 102 and 104 during rotation. At an individual angle, the 'A' FIG. is a perspective view, the 'B' FIG. is an elevational view that indicates subsequent sectional views. The 'C' view is a cross-section that shows details of the angle-specific portion-spacing sub-assembly 222. The 'D,' 'E,' and 'F' views show details of the rotation-determining sub-assembly 220. Thus, FIG. 4A is a perspective view of determinative hinge assembly 106 at a zero degree relative orientation or angle between the first and second portions 102 and 104. FIG. 4B is a corresponding elevational view. FIG. 4C is a sectional view that shows elements of the angle-specific portion-spacing sub-assembly 222. FIGS. 4D-4F are sectional views that show elements of the rotation-determining sub-assembly 220.

Figure 4C:
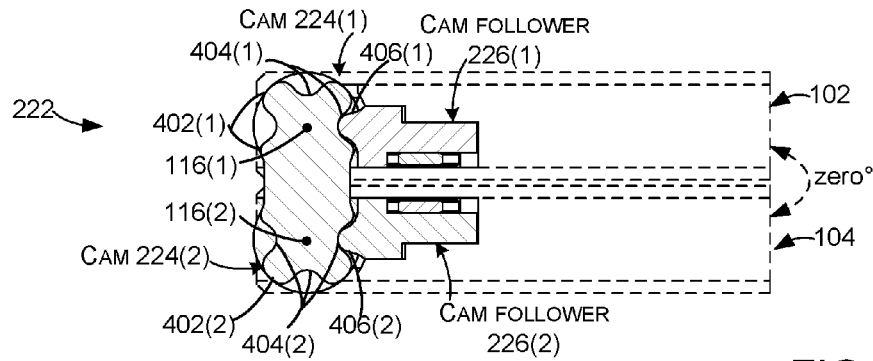

FIG. 4C shows a sectional view through the angle-specific portion-spacing sub-assembly 222. Cams 224 include high areas or surfaces 402 and low or recessed areas or surfaces 404. (Not all of the high and low surfaces are expressly designated). In this implementation, the high areas 402 and the low areas 404 alternate in a cloverleaf or star-like pattern. The cam followers 226 include a cam engagement surface 406. The cam engagement surface 406 engages the high and low surfaces during rotation of the first and second portions 102 and 104 around hinge axes 116. When the cam engagement surface 406 engages an individual high surface 402, the cam follower 226 (and the first or second portion 102 or 104 it is connected to) is pushed away from the respective axis of rotation 116. When the cam engagement surface engages an individual low surface 404, the cam follower 226 and the associated portion are biased back toward the hinge axis 116 by the springs 232 (FIGS. 4A, 4B, and 4D-4F). This aspect will become more apparent by comparing FIGS. 4A, 5A, 6A, etc.

Figure 4D:
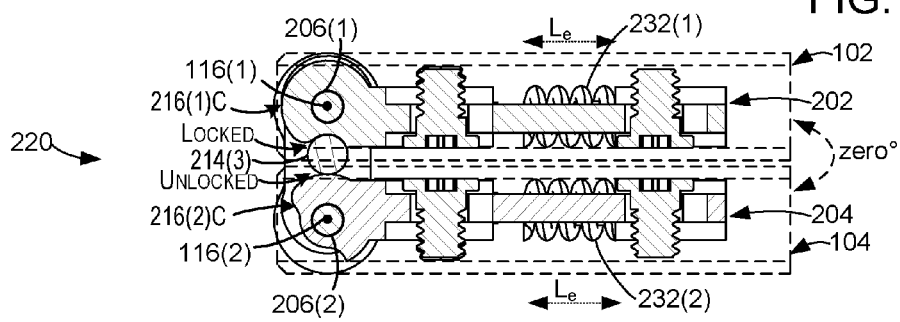
Figure 4E:
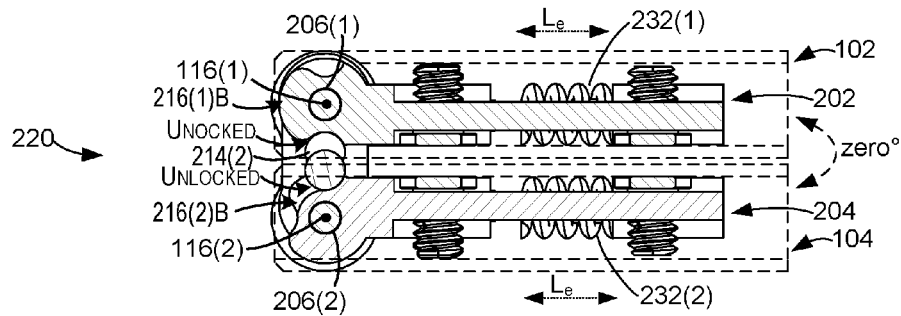
Figure 4F:
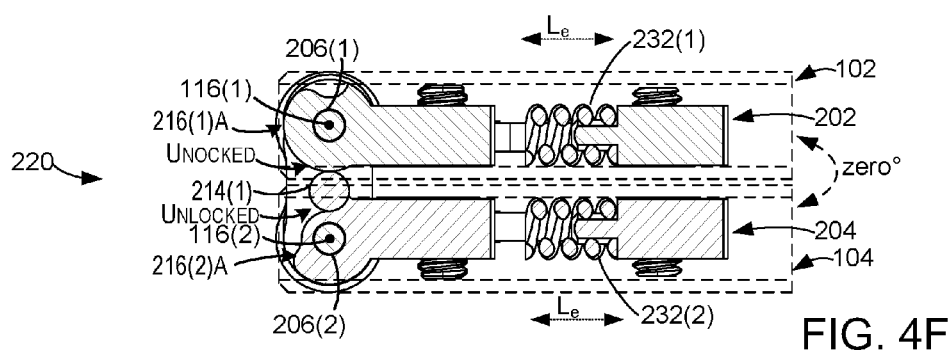
Figure 5A:
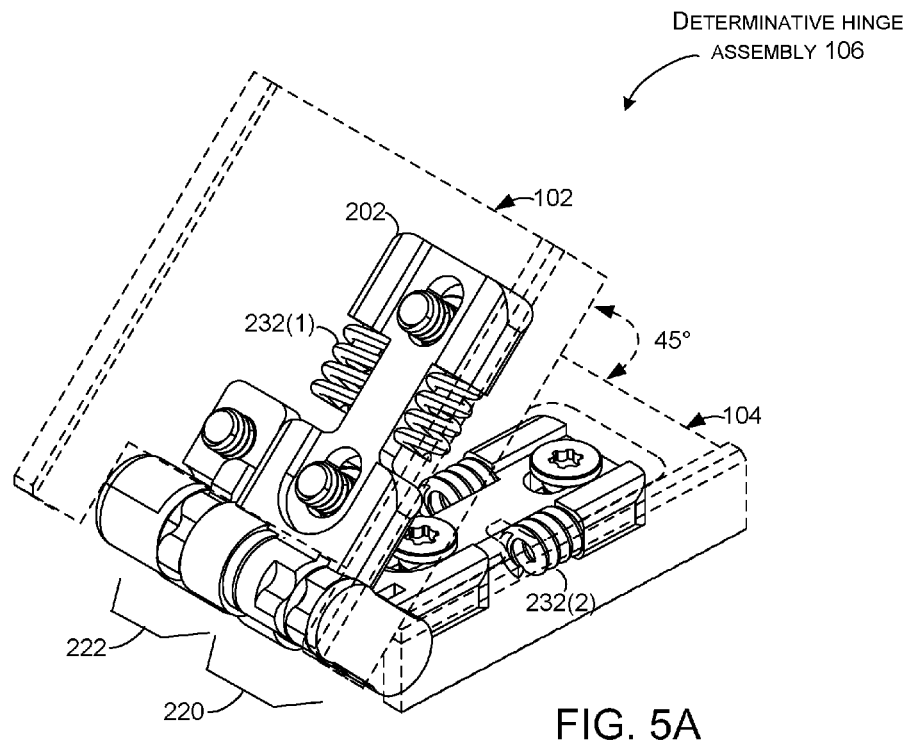
Figure 5B:
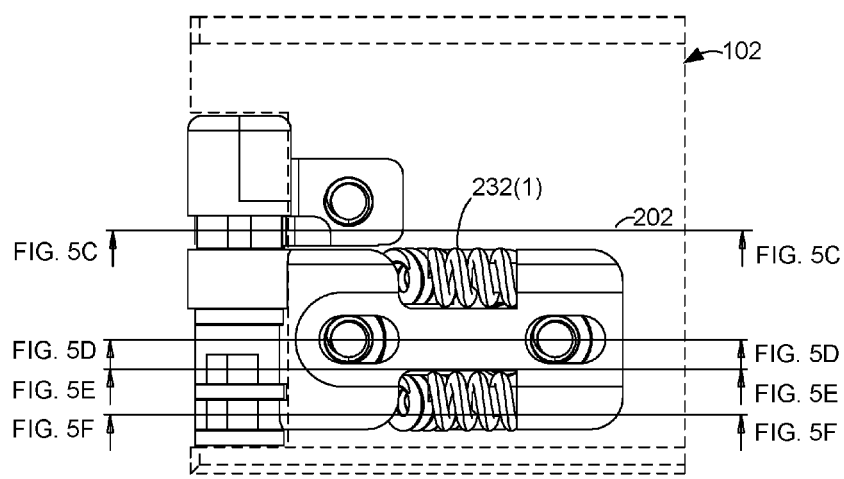
Figure 5C:
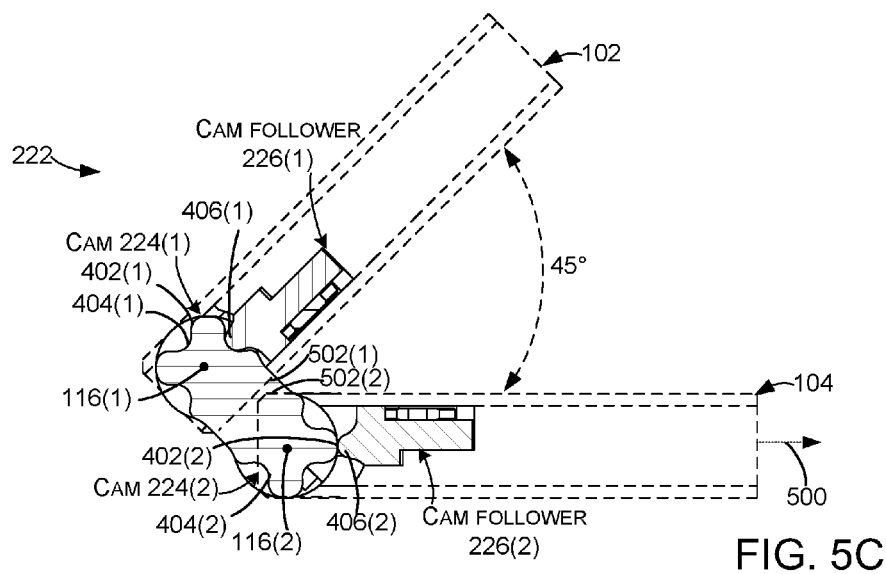
Figure 5D:
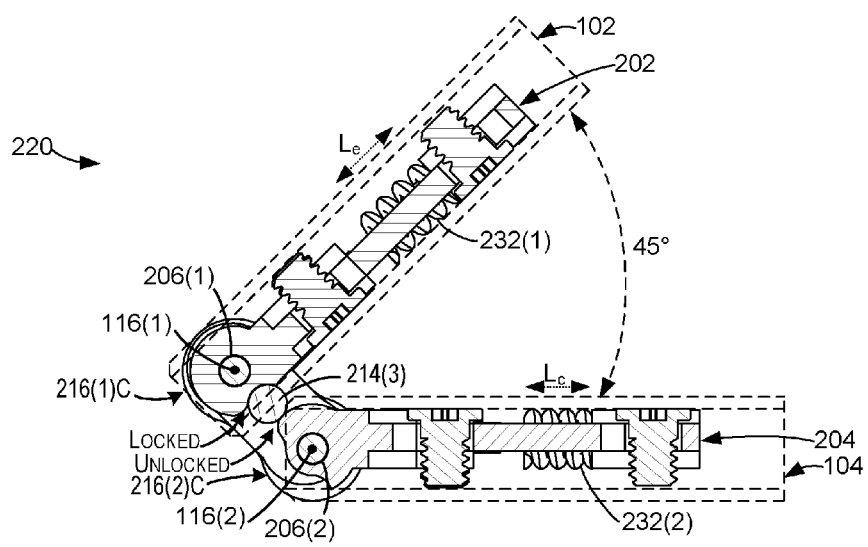
Figure 5E:
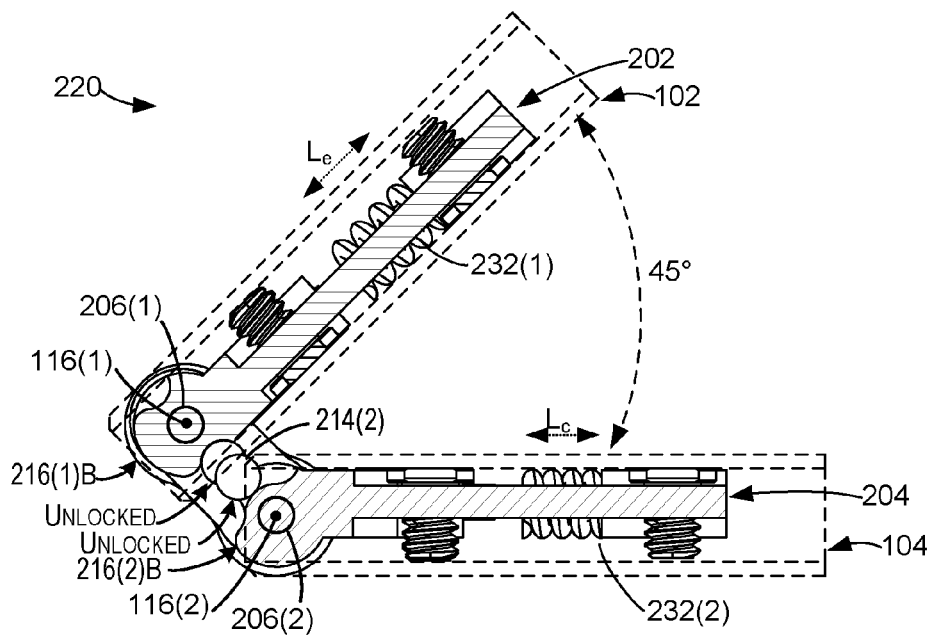
Figure 5F:
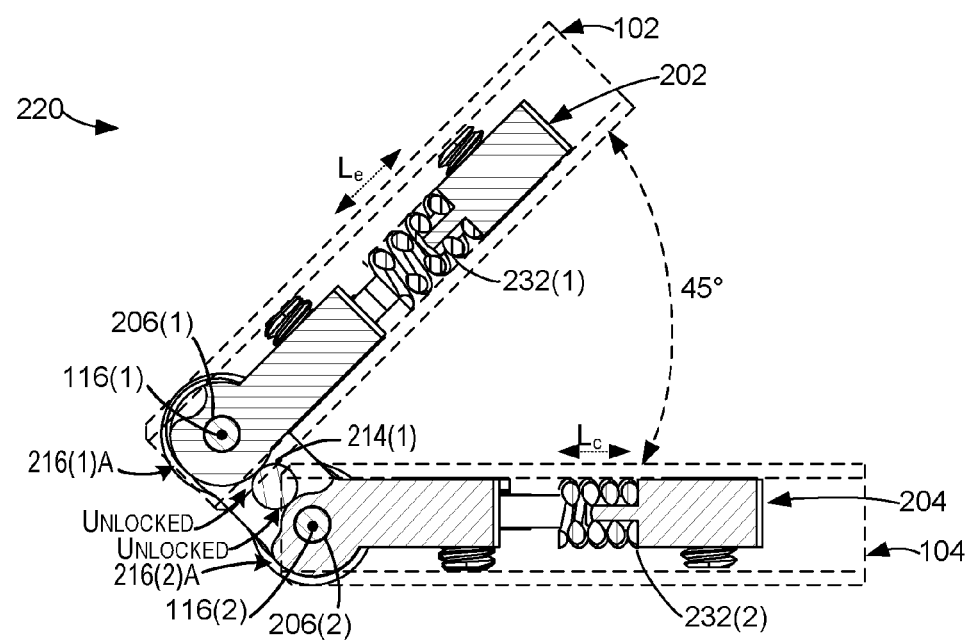
Figure 6A:
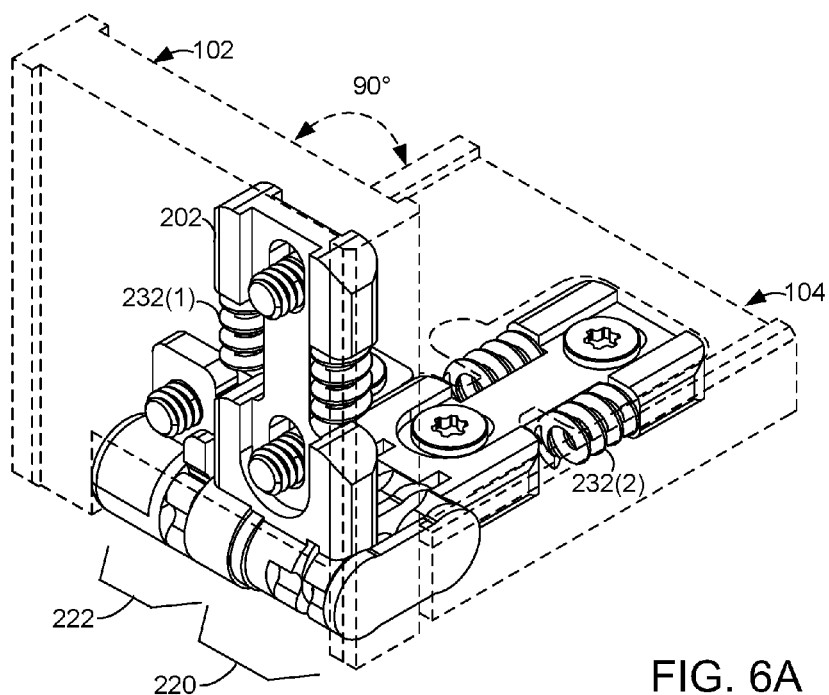
Figure 6B:
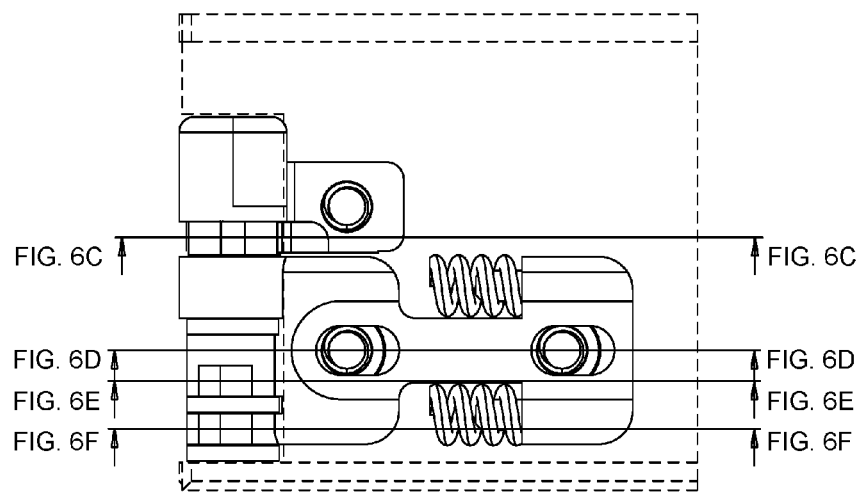
Figure 6C:
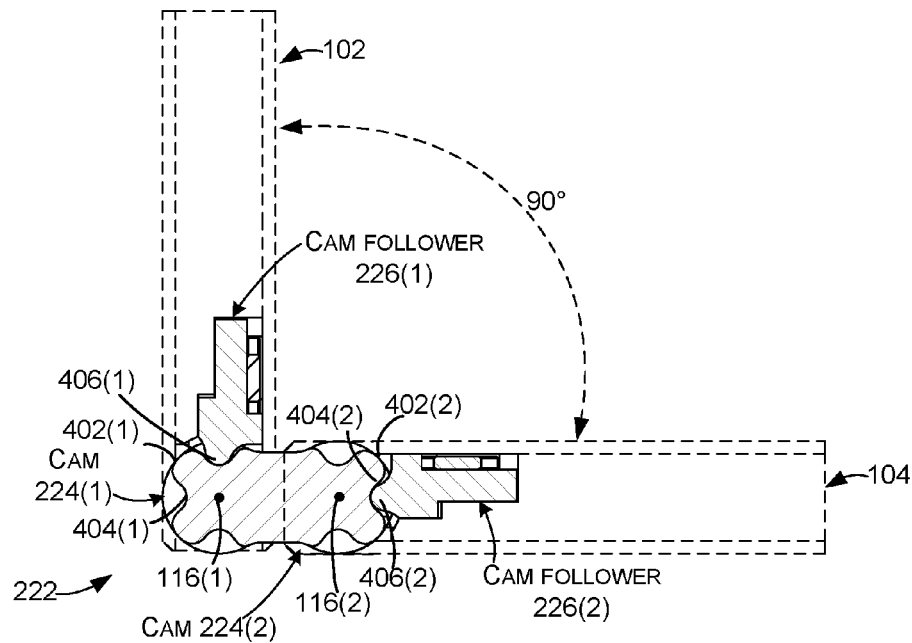
Figure 6D:
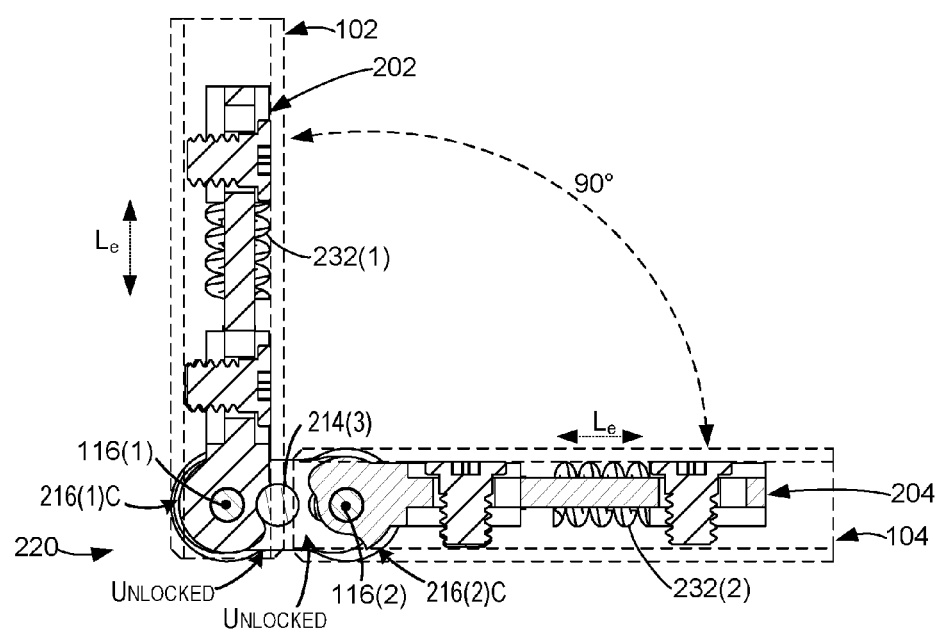
Figure 6E:
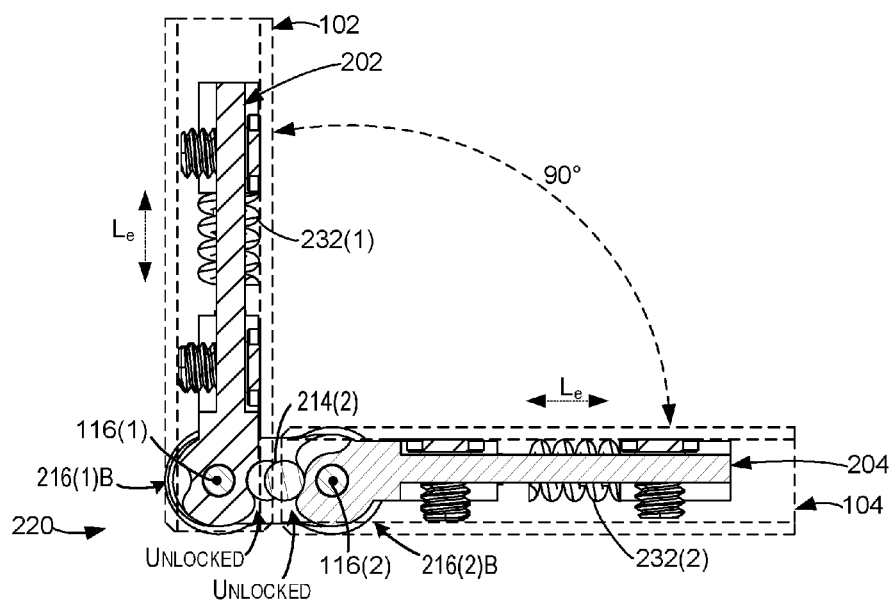
Figure 6F:
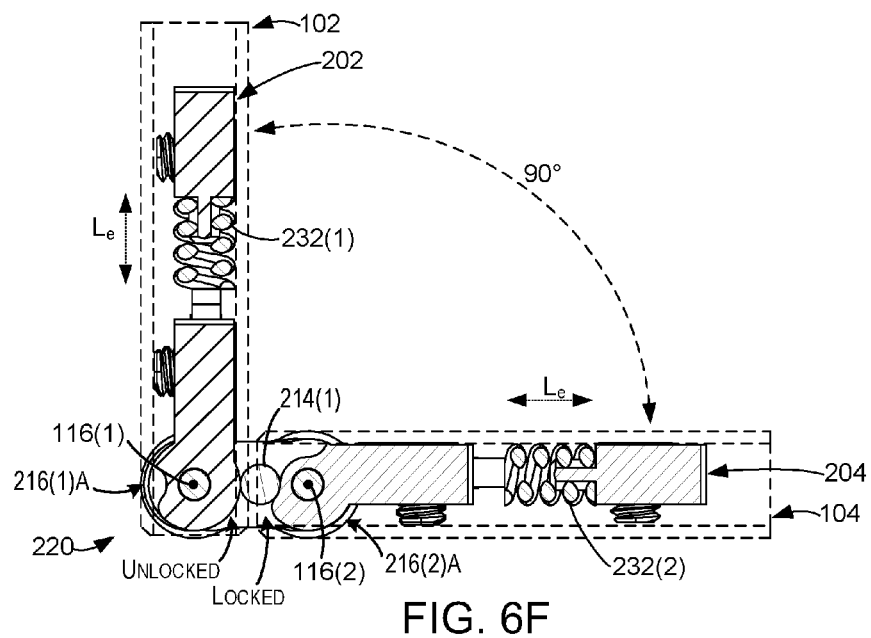
Figure 7A:
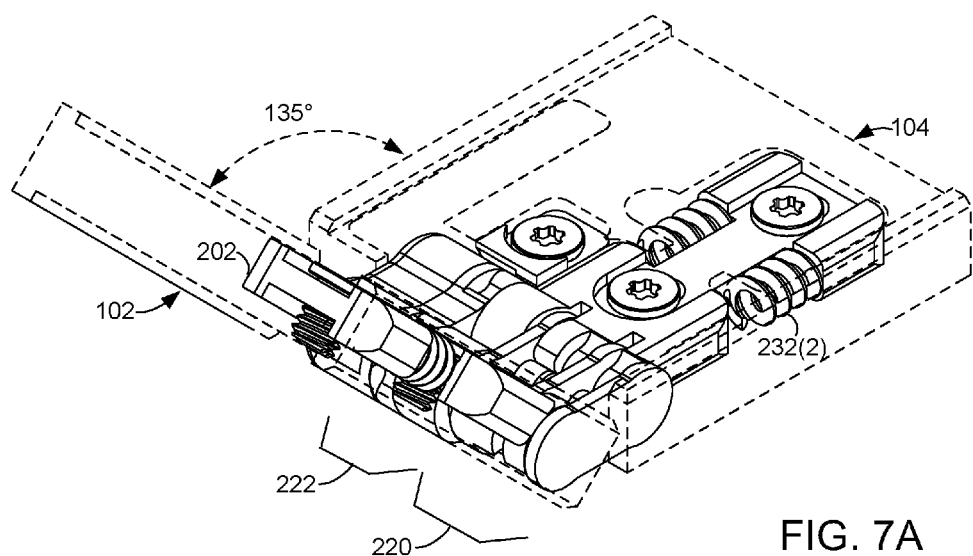
Figure 7B:
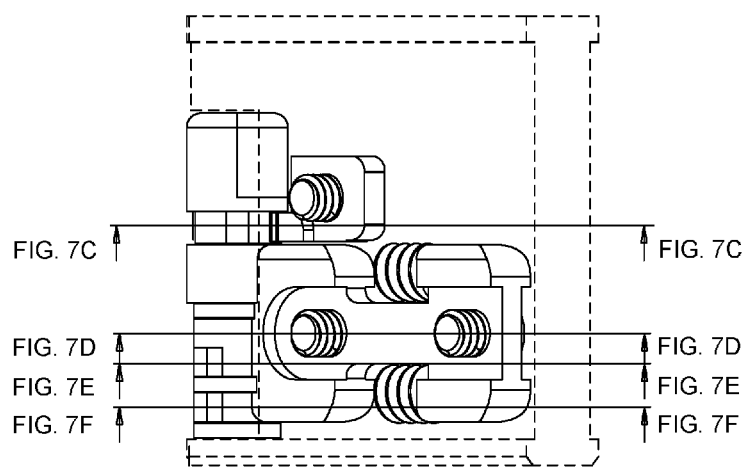
Figure 7C:
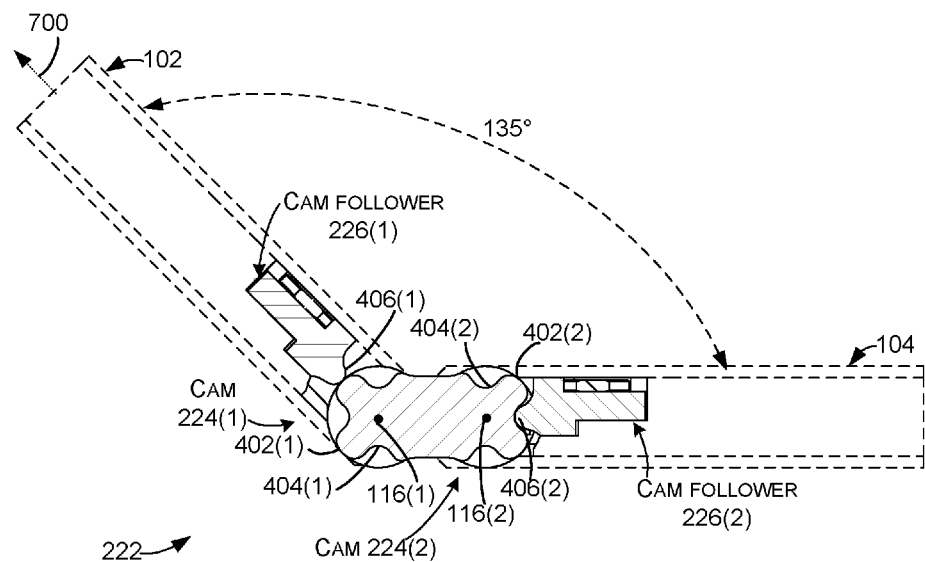
Figure 7D:
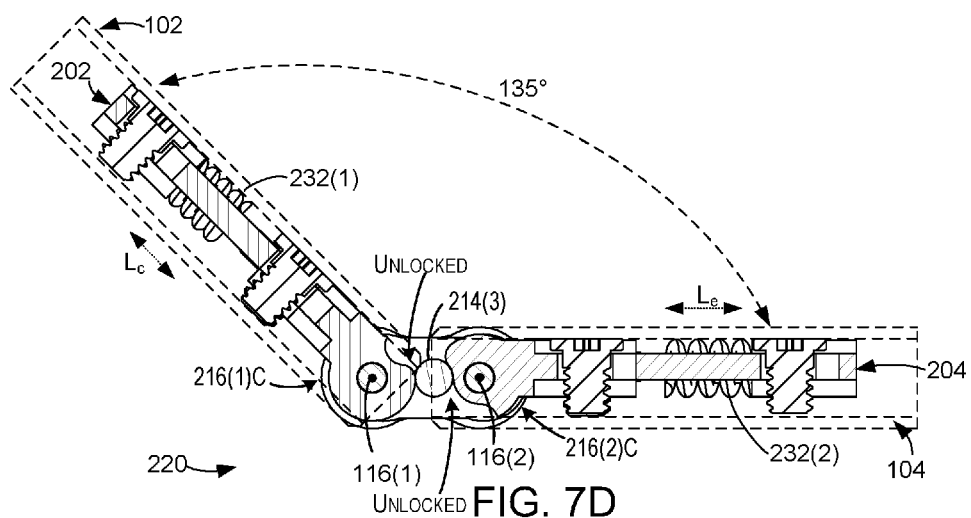
Figure 7E:
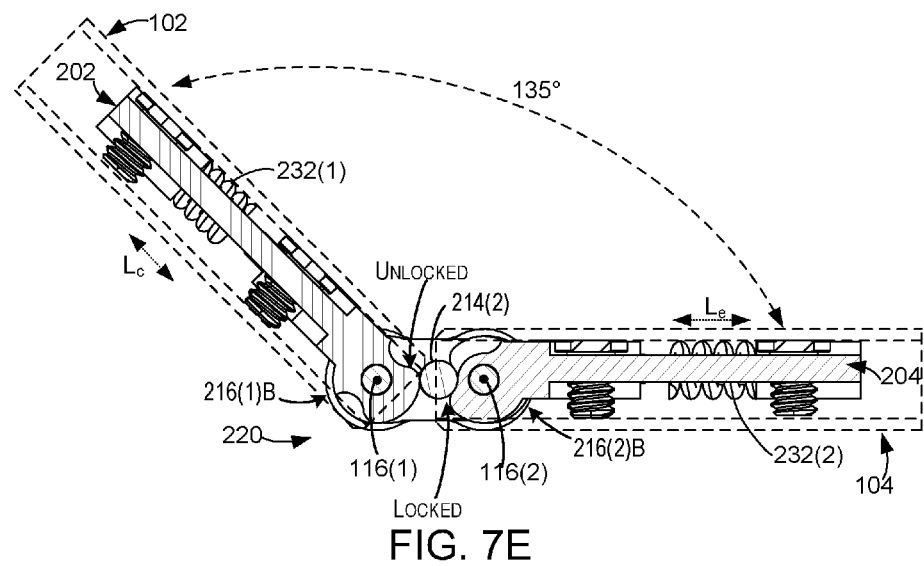
Figure 7F:
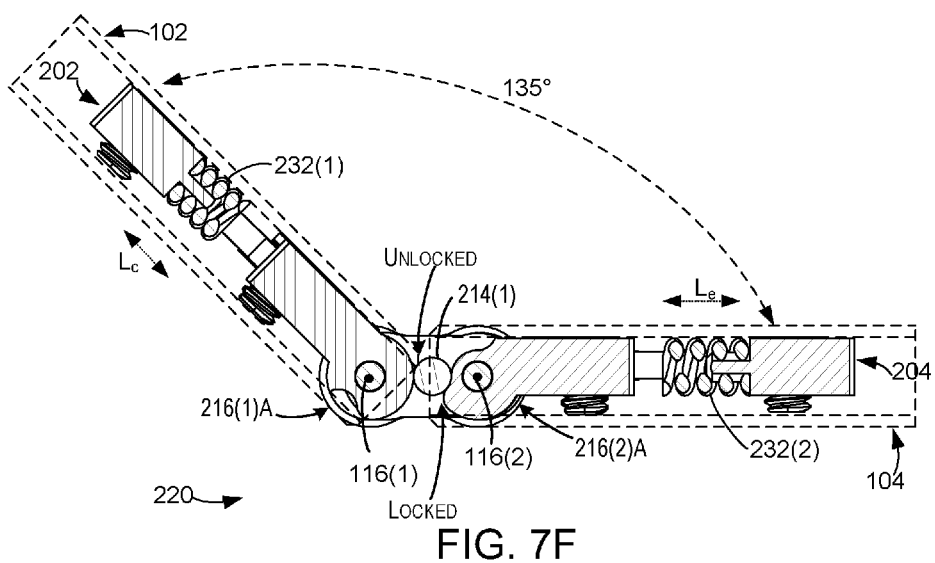
Figure 8A:
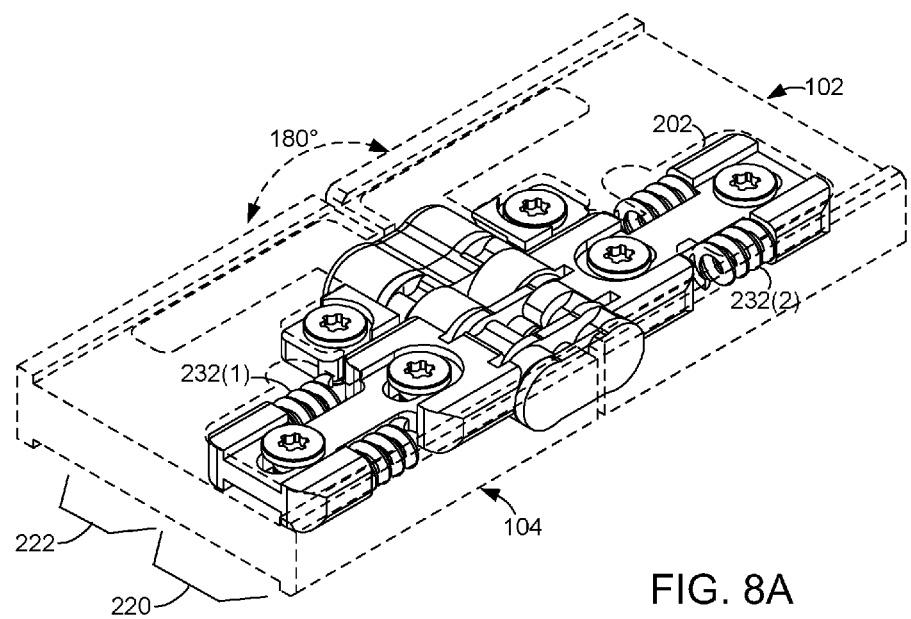
Figure 8B:
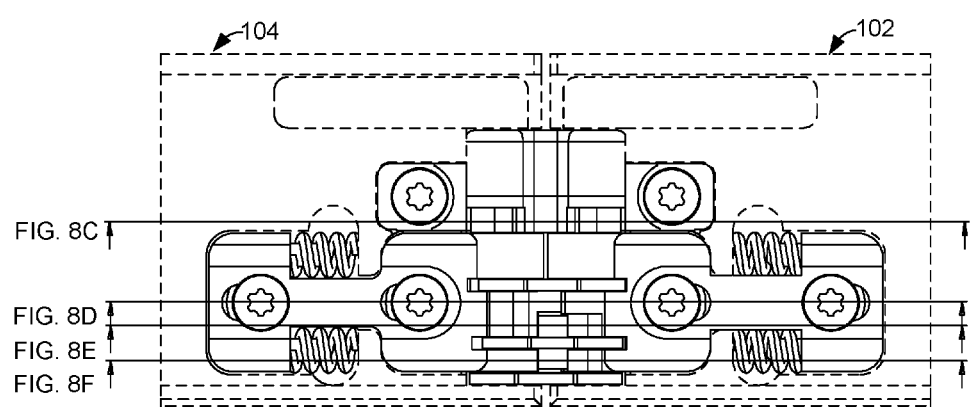
Figure 8C:
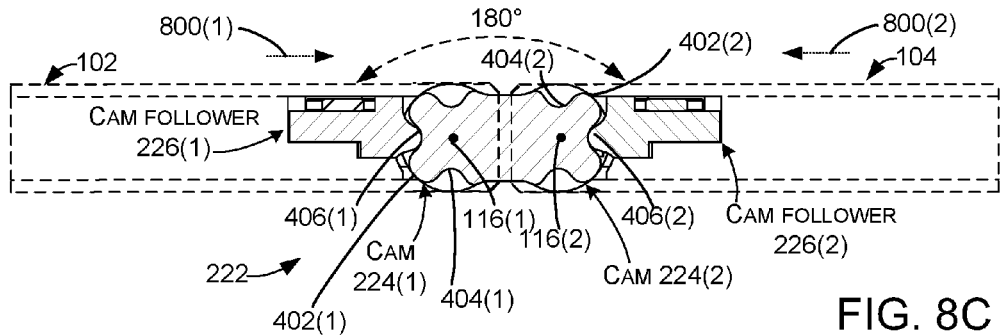
Figure 8D:
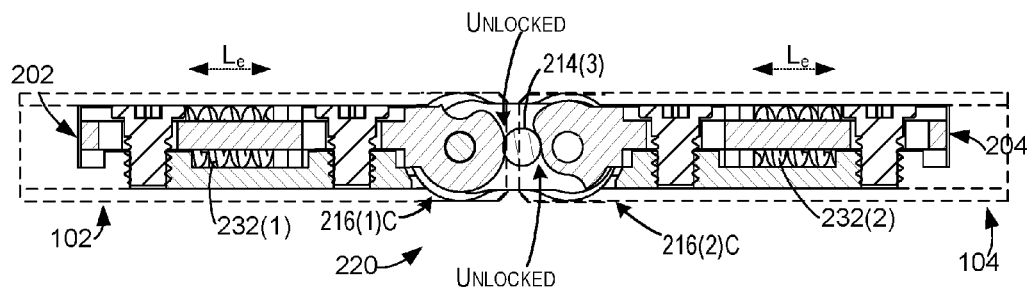
Figure 8E:
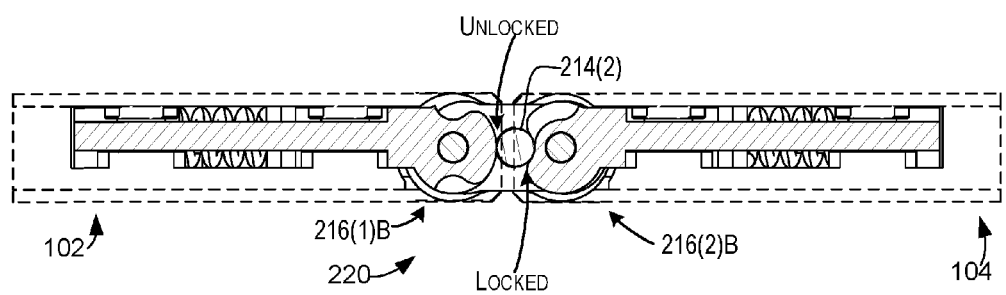
Figure 8F:
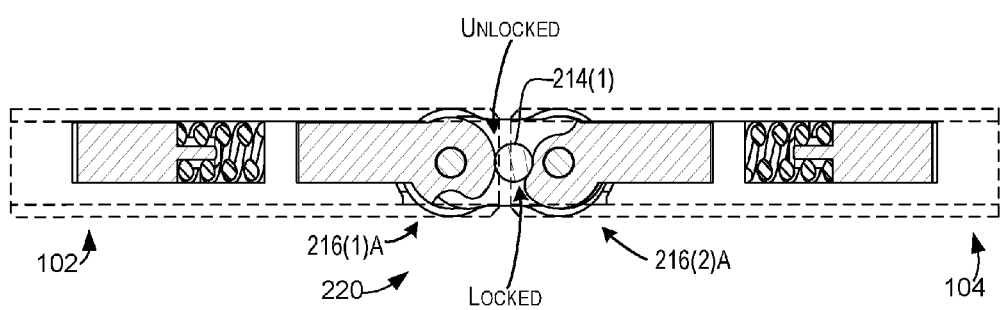
Figure 9A:
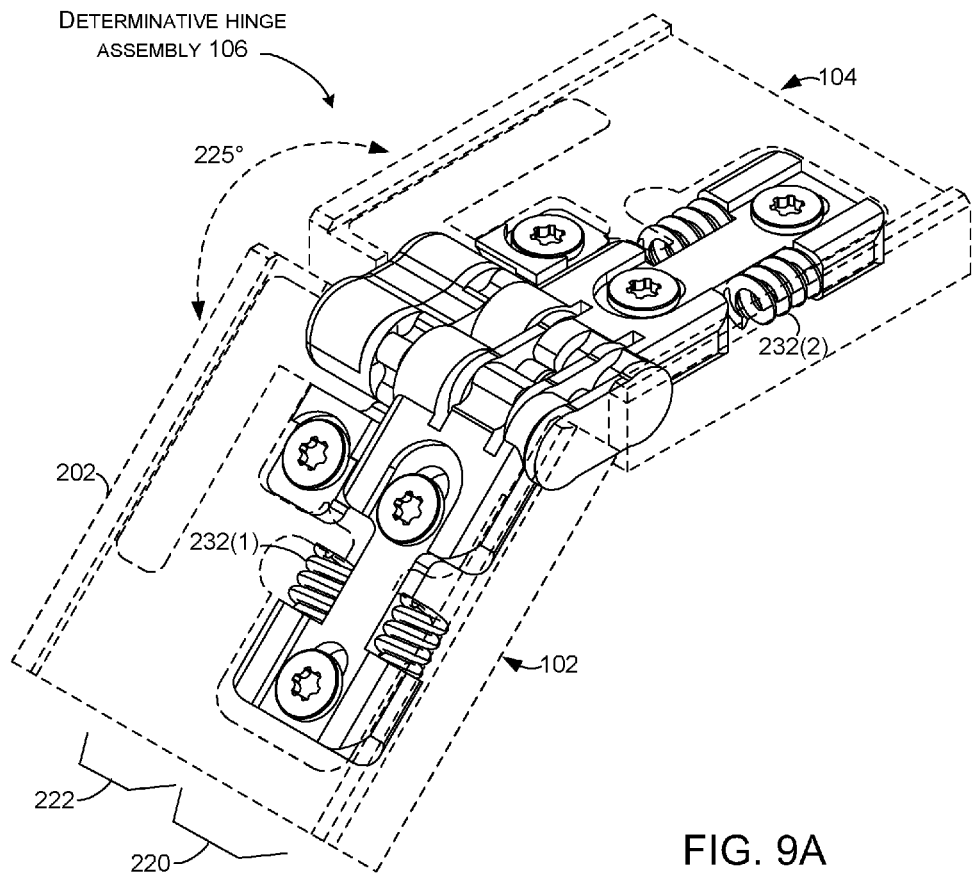
Figure 9B:
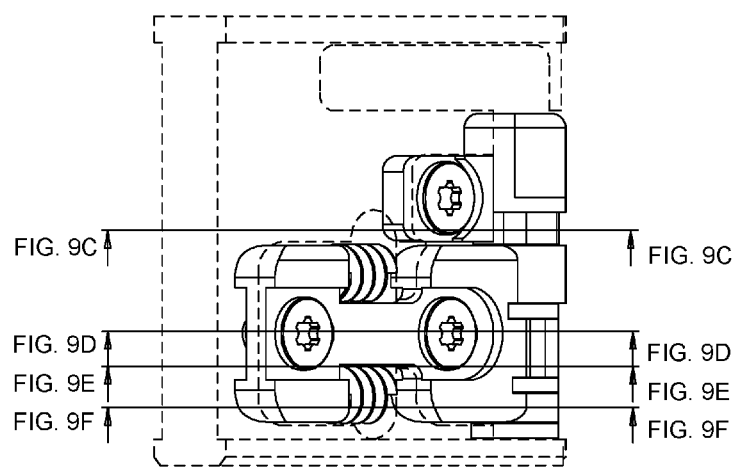
Figure 9C:
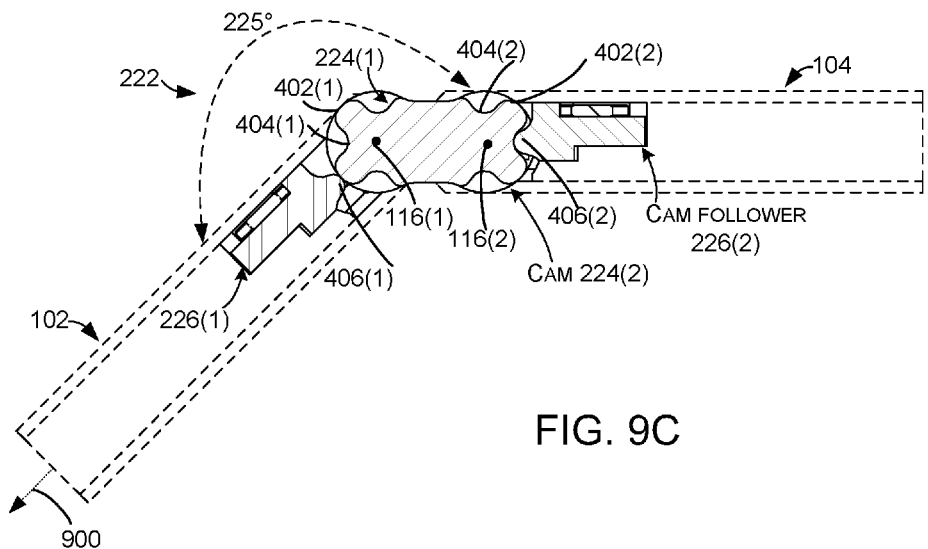
Figure 9D:
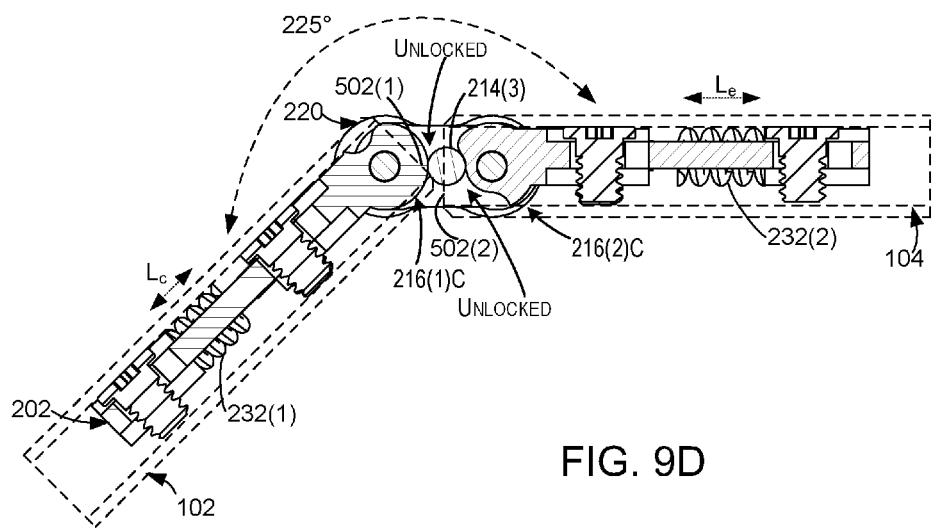
Figure 9E:
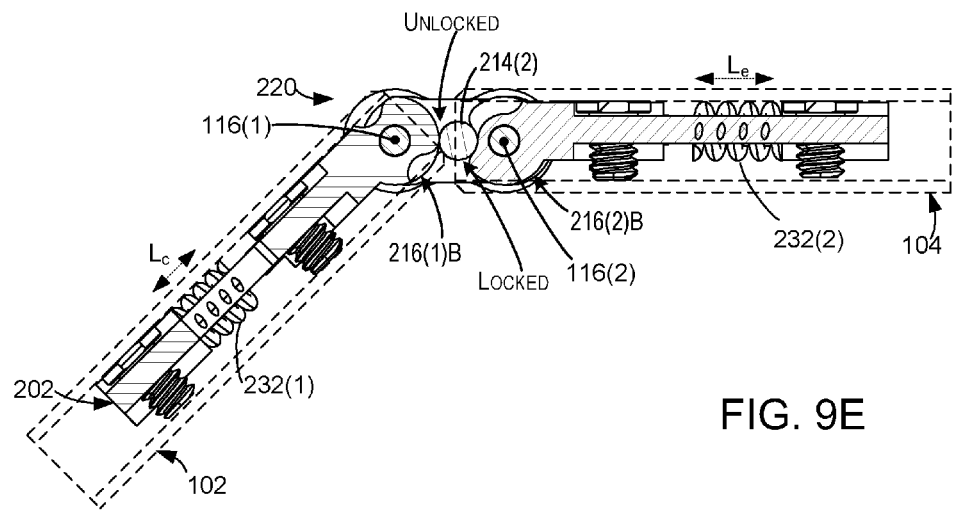
Figure 9F:
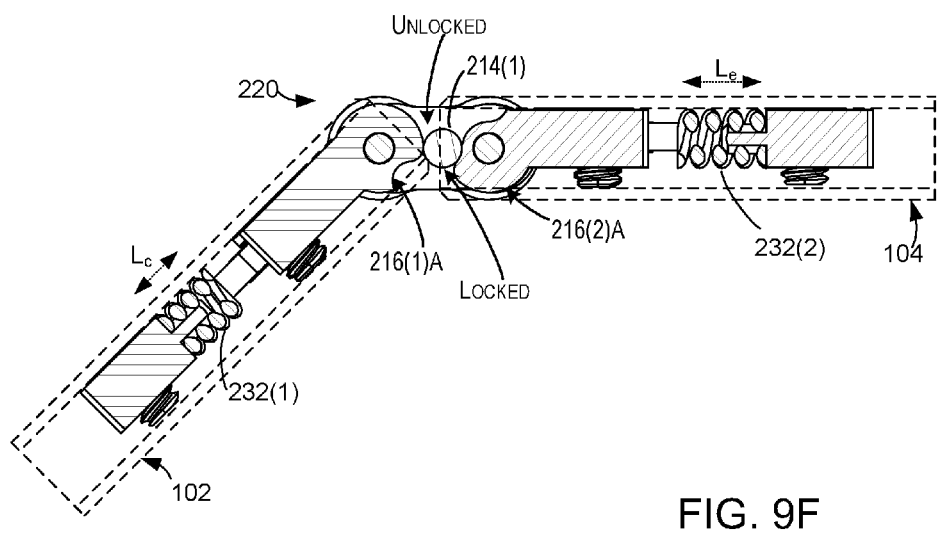

FIGS. 4D-4F show sectional views through rotation-determining sub-assembly 220 taken through cams 216. FIG. 4D shows a view through cams 216(1)C and 216(2)C, FIG. 4E shows a view through cams 216(1)B and 216(2)B, and FIG. 4F shows a view through cams 216(1)A and 216(2)A. Thus, this example includes three sets of opposing cams that control when rotation occurs around an individual hinge axis 116. The function of the cams 216 and associated followers 214 for controlling rotation around respective hinge pins 206 are described in detail above relative to FIGS. 3A-3D and thus is not revisited here in detail. Instead, note that as indicated in FIG. 4D, rotation around hinge pin 206(1) is locked and rotation around hinge pin 206(2) is unlocked by the cams 216 and the follower 214. In FIGS. 4E and 4F, rotation around both hinge pins 206 is unlocked. Thus, when considered collectively, starting at the zero degree orientation of FIGS. 4D-4F, rotation around the first hinge pin 206(1) is locked (locked by cam 216(1)C and follower 214(3) in FIG. 4D), but rotation around second hinge pin 206(2) is unlocked relative to each of the cams 216 in each of FIGS. 4D-4F and thus rotation can occur around hinge pin 206(2).

Thus, to summarize the zero degree orientation, springs 232 are biasing first and second portions 102 and 104 toward hinge axes 116. Cam followers 226 are in low areas (e.g., recesses) 404 on cams 224 and as such are not countering the springs 232 so the springs are extending to a length $L_e$ (extended length) and biasing the first and second portions toward the hinge axes. Further, rotation around hinge axis 116(1) is locked by cam 216(1)C while rotation around hinge axis 116(2) is unlocked.

FIGS. 5A-5F are similar to FIGS. 4A-4F except that the first and second portions 102 and 104 have been rotated to an acute angle of 45 degrees, such as by a user rotating the portions apart. Note that the rotation has occurred around hinge axis 116(2) and that hinge axis 116(1) remains locked (e.g., blocked from rotating). Thus, rotation occurred around hinge axis 116(2) and not around hinge axis 116(1).

Further, cam engagement surface 406(2) of cam follower 226(2) is now contacting a high area 402(2) of cam 224(2) rather than a low area 404(2). As such, cam follower 226(2) and thereby second portion 104 are forced away from axis of rotation 116(2) as indicated by arrow 500. This movement compresses spring 232(2) as shown by length $L_c$ (compressed length) which is shorter than the extended length $L_e$ of FIGS. 4A-4F. (Note that in all of the illustrated orientations the springs 232 are compressed to some degree between the portion 102/104 and the respective body 202/204 (e.g., the springs are preloaded) so the terms 'extended length' and 'compressed length' are relative terms rather than absolute terms.) This movement of the second portion 104 away from hinge axis 116(2) reduces and/or eliminates contact between a hinge end 502(1) of the first portion 102 with a hinge end 502(2) of the second portion 104.

FIGS. 6A-6F show further relative rotation of the first and second portions 102 and 104 to a ninety degree (or right angle or perpendicular) orientation. Like the initial rotation from zero degrees to 45 degrees, this rotation from 45 degrees to 90 degrees occurred around the second hinge axis 116(2) rather than the first hinge axis 116(1). Now at 90 degrees, if the first and second portions are rotated further apart, cams 216(1) and 216(2) unlock rotation around hinge axis 116(1) and lock rotation around hinge axis 116(2). At this point, cam followers 226 are in low areas 404 on respective cams 224. As such, springs 232 again bias the first and second portions toward their respective hinge axes 116.

Some implementations can be viewed from the perspective that a highest likelihood of contact and damage between the first and second portions 102 and 104 in the range from zero to 90 degrees occurs at around 45 degrees. In these implementations, cam 224 can have a profile such that the peak displacement of cam 224 at high area 402 is also at around 45 degrees and tapers down in both directions toward zero degrees and 90 degrees. This profile can be repeated for multiple quadrants (e.g., 45 degrees, 135 degrees, 225 degrees, 315 degrees).

FIGS. 7A-7F show further rotation from 90 degrees to an obtuse angle of 135 degrees. Further, this rotation occurred around the first hinge axis 116(1) because cams 216(1) are unlocked while cams 216(2) are locked relative to followers 214. Cam follower 226(1) is now engaging high area 402(1) on cam 224(1) which forces the cam follower and hence the first portion 102 away from first hinge axis 116(1) as indicated by arrow 700 and compresses spring 232(1).

FIGS. 8A-8F shows the rotation progressing from 135 degrees to 180 degrees between the first and second portions 102 and 104. This rotation continues around hinge axis 116(1) because rotation around hinge axis 116(2) remains blocked by cam 216(2) and follower 214. At this point, the cam followers 226(1) and 226(2) are both in low areas or recesses 404 of cams 224(1) and 224(2) respectively. As such, springs 232(1) and 232(2) are biasing the first and second portions toward each other (as indicated by arrows 800(1) and 800(2)) so that the first and second portions abut one another or nearly do. This can create a sense of a nearly continuous surface across the first and second portions.

FIGS. 9A-9F show further rotation from 180 degrees to 225 degrees. Rotation is continuing around hinge axis 116(1) because hinge axis 116(2) remains locked by cam 216(2) and followers 214 (as well as cam 216(1) preventing the follower from moving away from hinge axis 116(2) as discussed previously relative to FIGS. 3A-3D). At this point, in FIG. 9C, cam follower 226(1) is forced away from hinge axis 116(1) by engagement surface 406(1) contacting high area 402(1). The cam follower pulls the first portion 102 away from hinge axis 116(1) and compresses spring 232(1) as indicated by arrow 900. This movement of the first portion 102 can keep its hinge end 502(1) (FIG. 9D) from contacting the hinge end 502(2) of the second portion 104 and causing damage to either or both of the first and second portions.

Figure 10A:
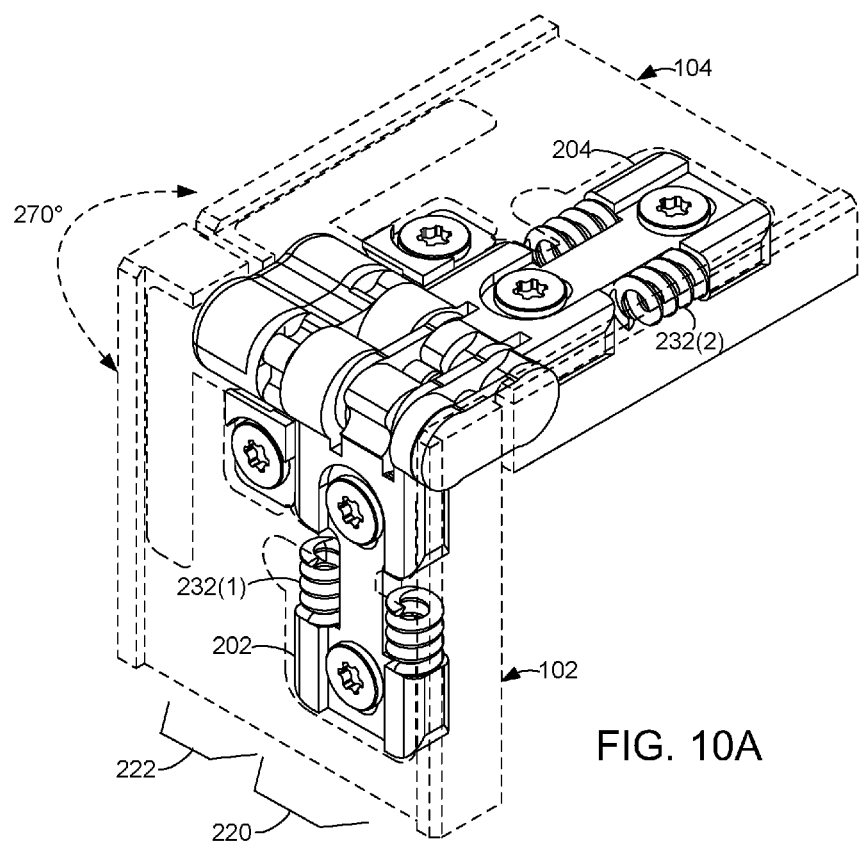
Figure 10B:
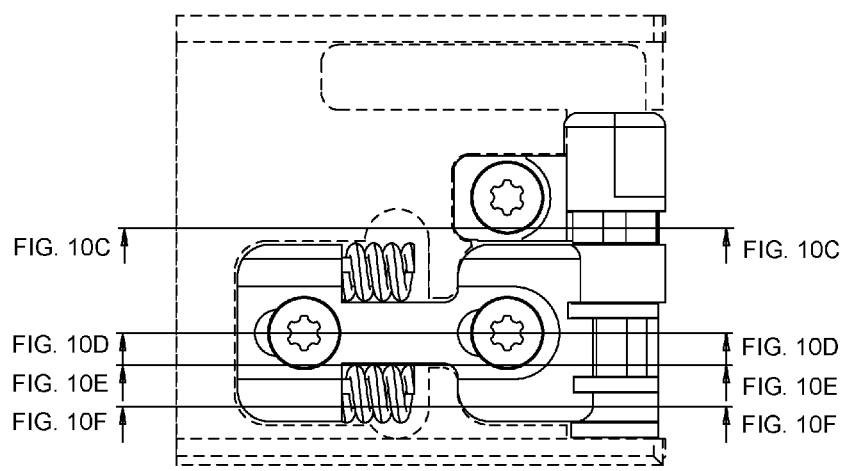
Figure 10C:
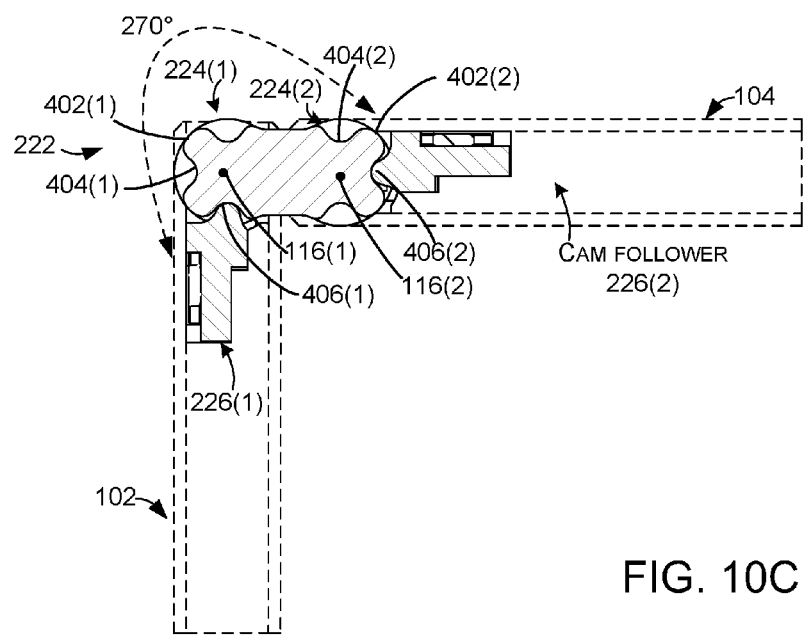
Figure 10D:
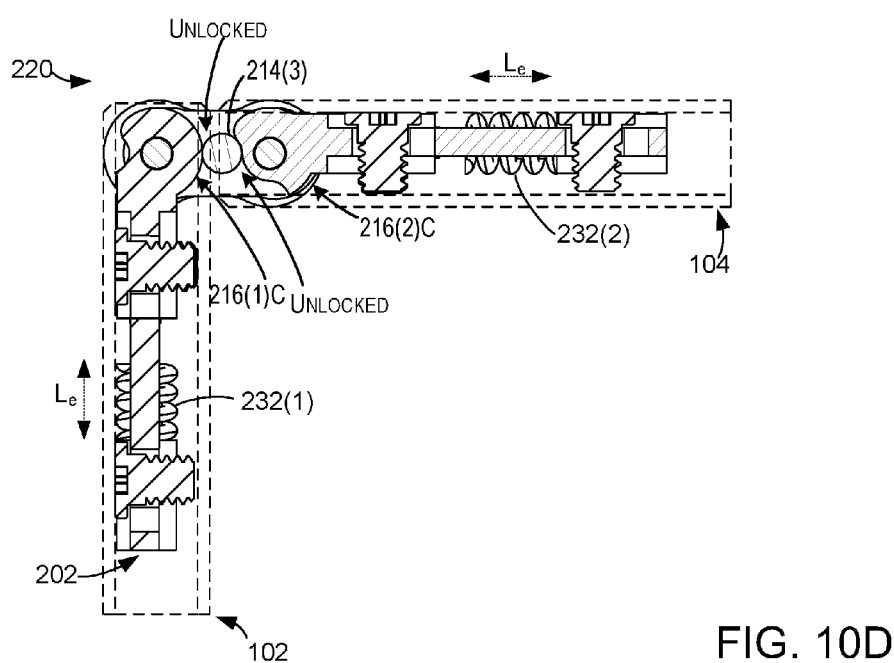
Figure 10E:
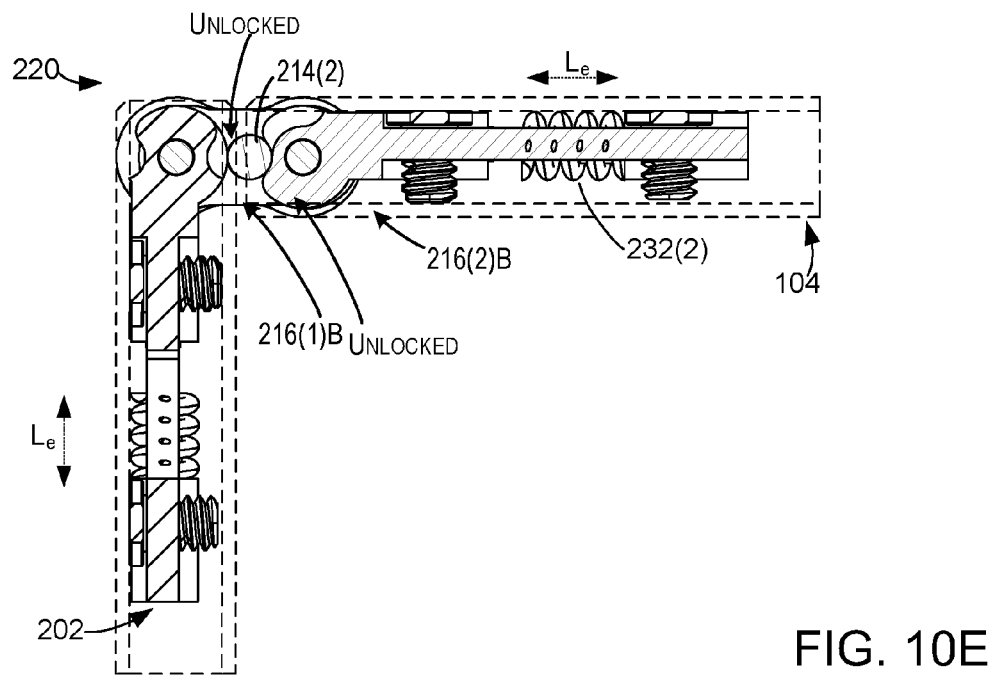
Figure 10F:
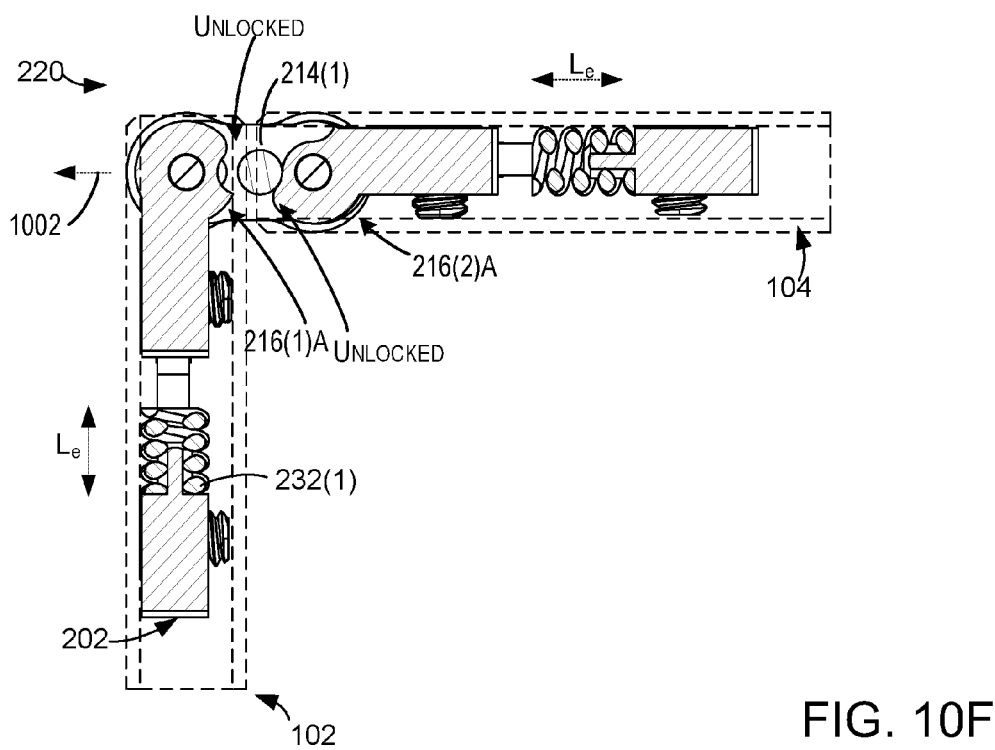
Figure 11A:
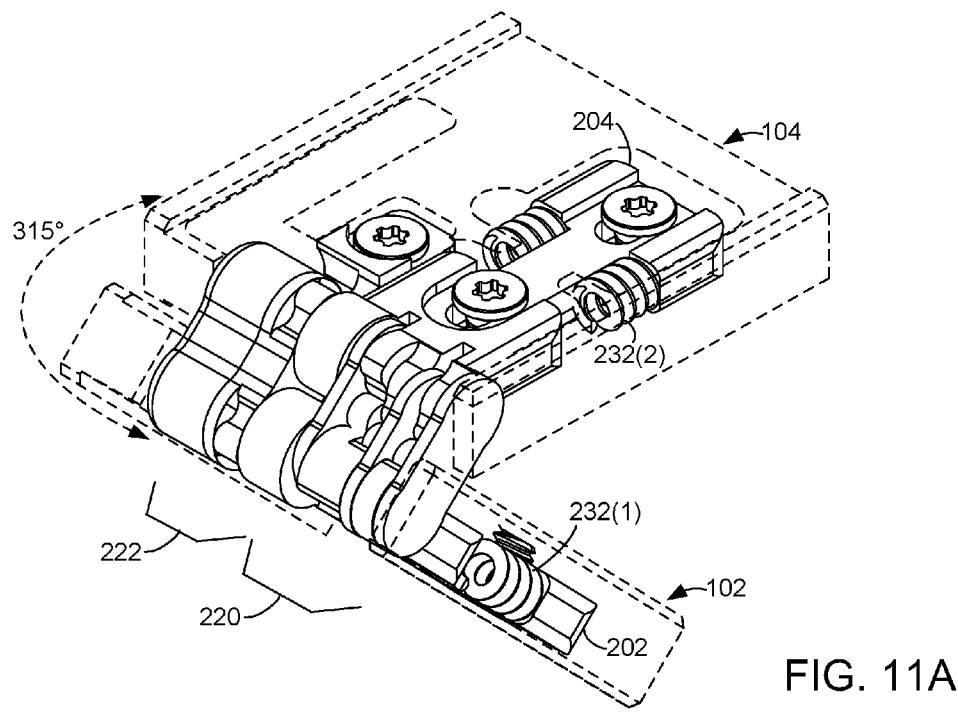
Figure 11B:
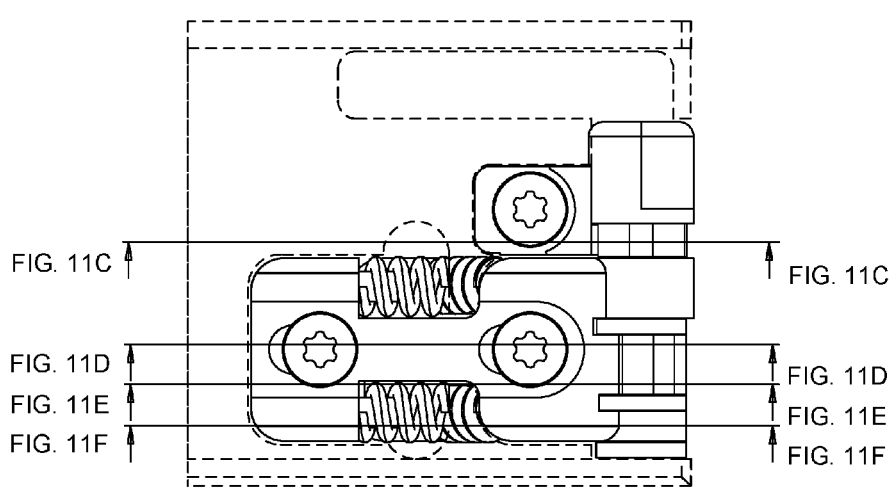
Figure 11C:
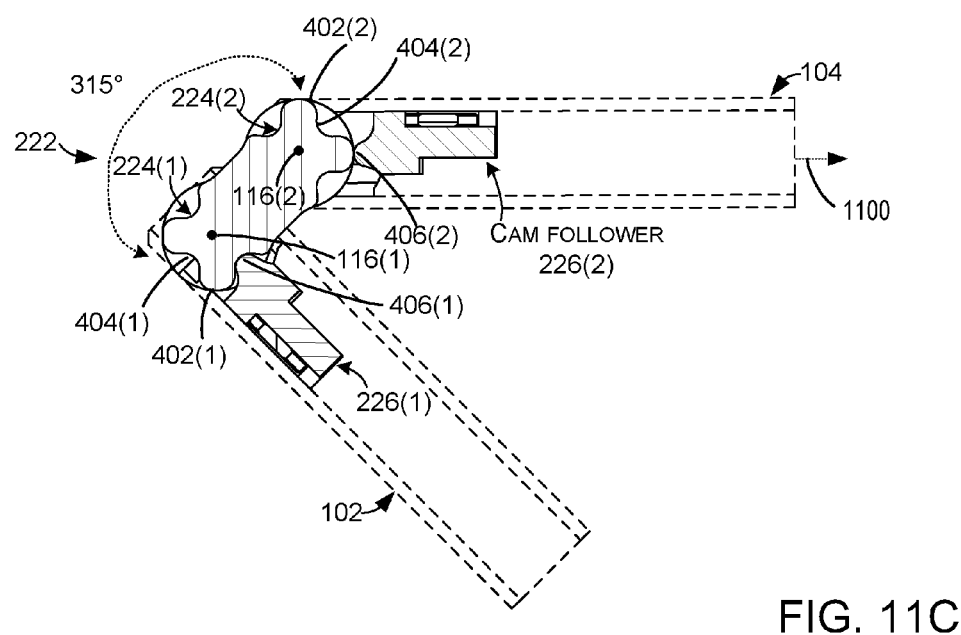
Figure 11D:
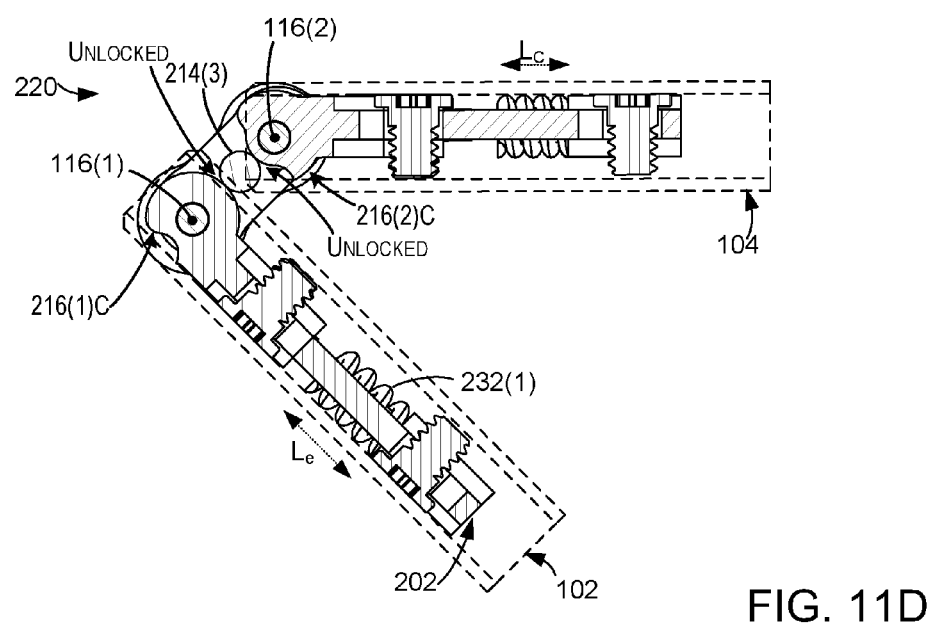
Figure 11E:
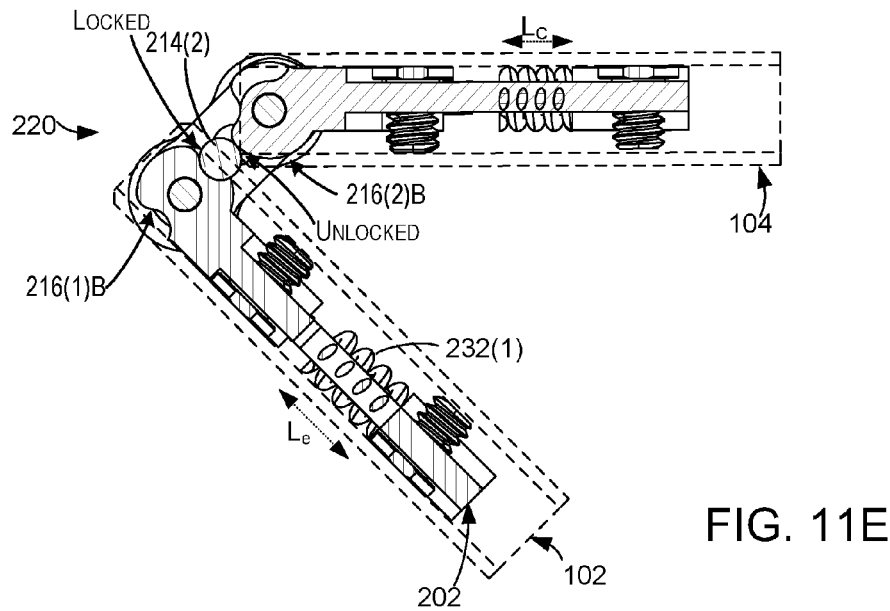
Figure 11F:
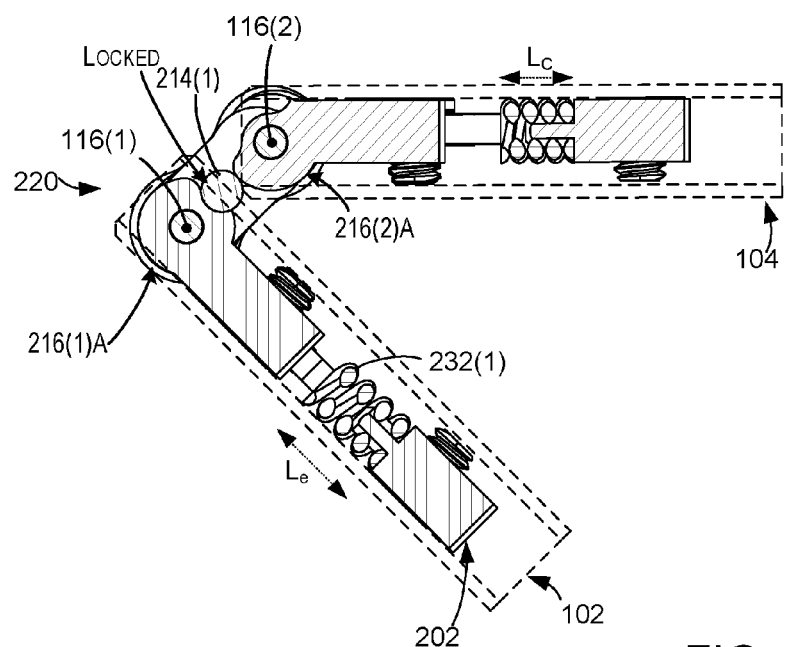
Figure 12A:
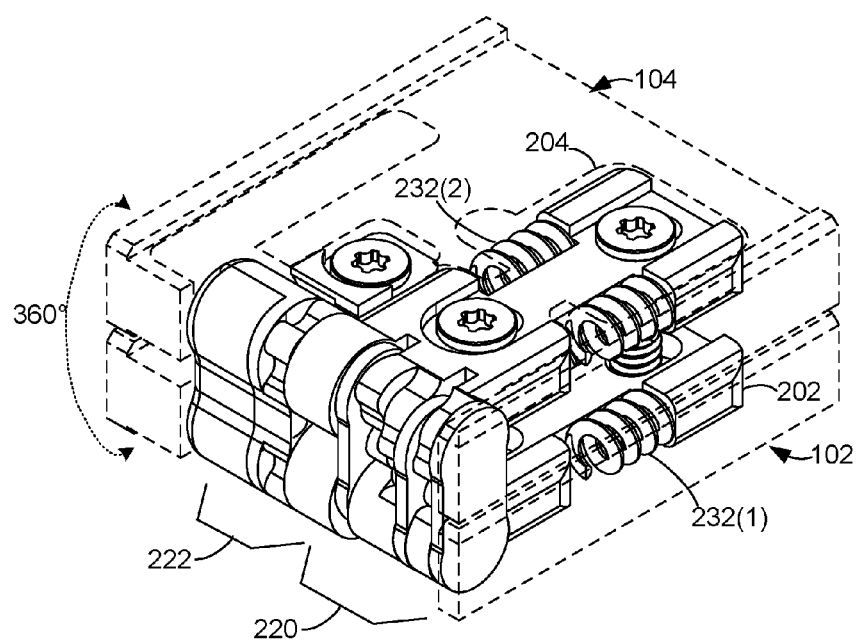
Figure 12B:
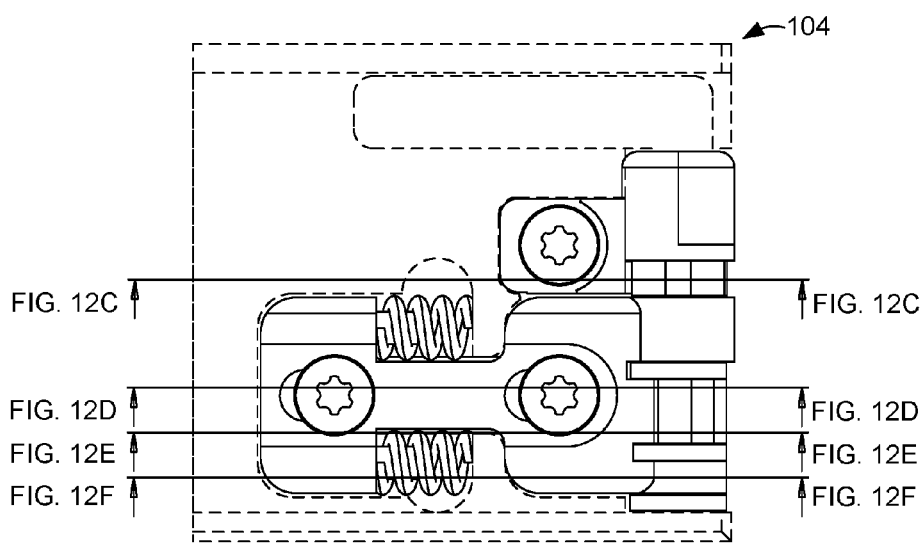
Figure 12C:
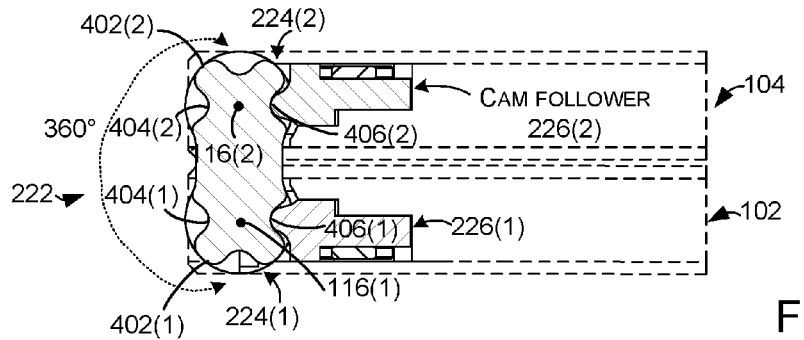
Figure 12D:
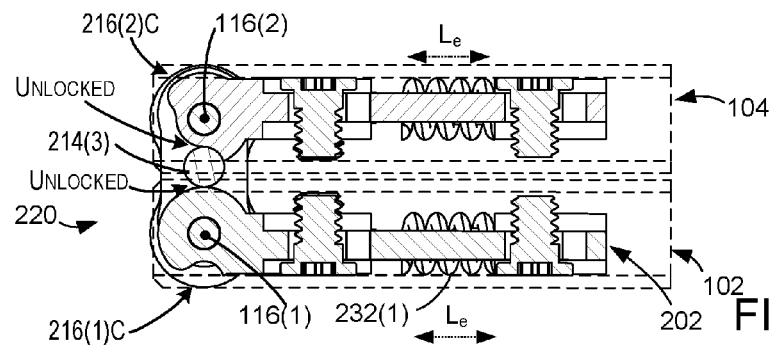
Figure 12E:
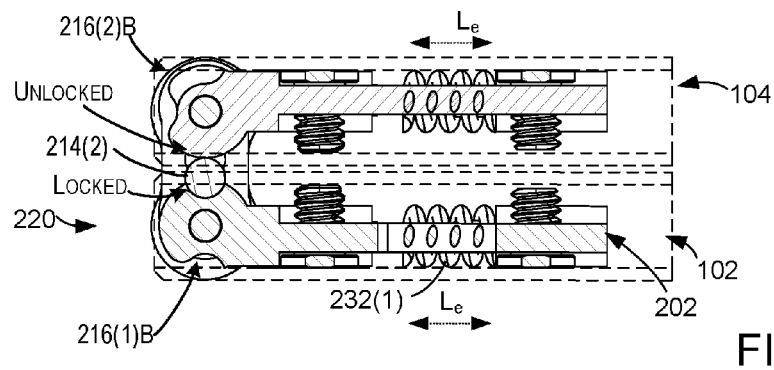
Figure 12F:
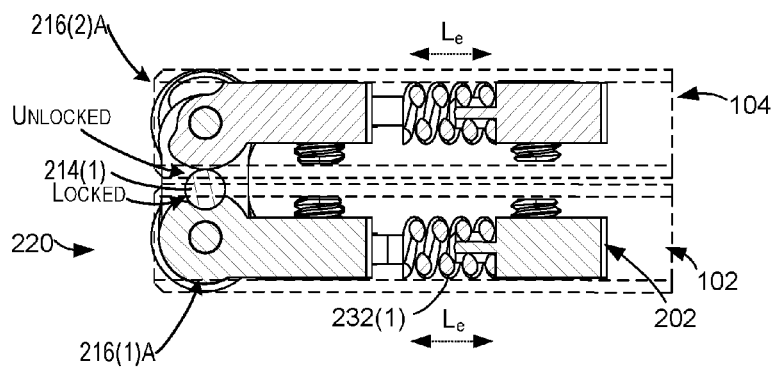

FIGS. 10A-10F show continued rotation from 225 degrees to 270 degrees between the first and second portions 102 and 104 around determinative hinge assembly 106. At this point cam 216(1) allows followers 214 to move to the left as indicated by arrow 1002 (FIG. 10F). This movement of the follower will free rotation around hinge axis 116(2) and lock rotation around hinge axis 116(1). Both followers 226 are in low areas 404 of the cams 224 so the springs 232 can expand to their extended length ($L_e$) and bias the first and second portions 102 and 104 toward respective hinge axes 116(1) and 116(2).

FIGS. 11A-11F show a further 45 degrees of rotation to 315 degrees. At this point, in FIG. 11C, cam 224(2) has forced cam follower 226(2) and hence second portion 104 away from hinge axis 116(2) as indicated by arrow 1100 so that the first and second portions do not contact one another. This is reflected in spring 232(2) being compressed ($L_c$) and spring 232(1) being extended ($L_e$).

FIGS. 12A-12F show another 45 degrees of rotation to 360 degrees. The first portion 102 is biased toward first hinge axis 116(1) and second portion 104 is biased toward second hinge axis 116(2) by springs 232(1) and 232(2), which are in their extended state (e.g. extended state reflected by length $L_e$).

FIGS. 4A-12F show rotation through a set or range of angles of rotation, which in this implementation span from zero degrees to 360 degrees. Other implementations may have different ranges of rotation. In FIGS. 12A-12F, the device is now at the extent of its rotation, but can be rotated in the opposite direction. Once again, cams 216 in combination with followers 214 can control when rotation occurs around an individual hinge axis 116. In this case, rotation around hinge axis 116(1) is initially blocked, but rotation can occur around hinge axis 116(2).

In review, rotation-determining sub-assembly 220 can control the order of rotation around individual hinge axes 116. In this example, rotation from zero degrees to 90 degrees occurred around second hinge axis 116(2), rotation from 91 degrees to 270 degrees occurred around hinge axis 116(1), and rotation from 271 to 360 returned to hinge axis 116(2). The angle-specific portion-spacing sub-assembly 222 can contribute to spacing the first and second portions apart during rotation when they are likely to contact one another and cause damage. This generally occurs at non-parallel and non-perpendicular orientations (e.g., oblique angles).

From one perspective, some implementations can relate to a double-sided clamshell device comprised of first and second portions. In some configurations, the device can be square when viewed from the side (such as in FIGS. 12C-12F). The nature of hinge pivots tracing circular outlines can cause such a device to crash into itself when the hinge is articulated. The present hinge concepts can allow the two device halves to separate for the two portions to clear each other and return in certain device orientations to provide a clean look and/or a nearly seamless collective display area.

In some implementations, cam followers 226 can be integrated into each device portion and can be hard mounted to the portion's chassis or housing so they move as a unit. The cams 224 can be a part of the hinge that is between the two device portions. The hinges can be mounted to each chassis with a single degree of freedom. The hinge to chassis interface can be manifest as a slider interface. Springs 232 or other biasing element can serve to draw the hinges into the chassis. This biasing can create a pressure interface between the cam follower in the chassis and the cams within the hinge. Fully determinant motion can be achieved through the use of the cam lock hinge (e.g., rotation-determining sub-assembly) which can ensure a single active pivot at any given time and a spring-biased cam-cam follower interface (e.g., angle-specific portion-spacing sub-assembly 222) that controls relative spacing between the portions and their respective hinge axes 116.

The present concepts can provide several valuable aspects to device design to improve appearance and performance of folding devices. One of these aspects can relate to a cam profile that includes alternating high and low areas, such as the cloverleaf shaped pattern or arrangement of cams 224, which can allow cam follower 226 that is biased using springs 232 to determine device separation through the range of articulation. The cam profile can provide separation where damage is likely to occur, such as at acute and obtuse angles and detents to allow spring control at other angles, such as at 0, 180, 270 and 360 degrees, for example.

Various device examples are described above. Additional examples are described below. One example includes a device comprising a first portion and a second portion and a determinative hinge assembly that rotatably secures the first and second portions around first and second hinge axes through a set of relative angles of rotation. The determinative hinge assembly comprises a rotation-determining sub-assembly that controls whether sub-sets of rotation between the first and second portions occur around the first hinge axis or the second hinge axis. The determinative hinge assembly further comprises an angle-specific portion-spacing sub-assembly that forces the first and second portions apart from one another at individual angles within the sub-sets.

Another example can include any of the above and/or below examples where the rotation-determining sub-assembly comprises a first cam positioned around the first hinge axis and an opposing second cam positioned around the second hinge axis.

Another example can include any of the above and/or below examples where the device further comprises a follower interposed between the first cam and the second cam.

Another example can include any of the above and/or below examples where the first cam is manifest on a first body that is secured to the first portion with a single degree of freedom orthogonal to the first hinge axis.

Another example can include any of the above and/or below examples where the device further comprises a biasing element that resiliently biases the first portion toward the first axis along the single degree of freedom.

Another example can include any of the above and/or below examples where the angle-specific portion-spacing sub-assembly comprises a first cam positioned on the first hinge axis and where the first portion includes a first cam follower that engages the first cam.

Another example can include any of the above and/or below examples where the cam comprises alternating high areas and low areas and where engagement of the high areas force the first portion away from the first hinge axis.

Another example can include any of the above and/or below examples where the high areas correspond to a multiple of 45 degrees of relative rotation within the set of relative angles of rotation.

Another example can include any of the above and/or below examples where the alternating high areas and low areas are arranged in a cloverleaf arrangement.

Another example can include any of the above and/or below examples where the angle-specific portion-spacing sub-assembly further comprises a second cam positioned on the second hinge axis and where the second portion includes a second cam follower that engages the second cam.

Another example can include any of the above and/or below examples where the sub-sets comprise a multiple of 90 degrees, and where the individual angles comprise oblique angles.

Another example can include any of the above and/or below examples where the rotation-determining sub-assembly resiliently biases the first portion toward the first hinge axis and resiliently biases the second portion toward the second hinge axis, and where the angle-specific portion-spacing sub-assembly overcomes the resilient bias and forces either the first portion away from the first hinge axis or the second portion away from the second hinge axis at individual oblique angles within the set of relative angles of rotation.

Another example can include a device comprising a first portion that defines a first hinge axis and is resiliently biased toward the first hinge axis and a second portion that defines a second hinge axis and is resiliently biased toward the second hinge axis. The device further comprises a first cam that operates relative to the first hinge axis and is slidably secured to the first portion and a second cam that operates relative to the second hinge axis and is slidably secured to the second portion, where when the first and second portions are oriented at an acute angle the second cam overcomes the resilient bias and forces the second portion away from the second hinge axis while the first cam allows the first portion to remain biased toward the first hinge axis, and where when the first and second portions are oriented at an obtuse angle the first cam overcomes the resilient bias and forces the first portion away from the first hinge axis while the second cam allows the second portion to be biased back toward the second hinge axis.

Another example can include any of the above and/or below examples where the device further comprises a third cam that controls whether rotation at individual angles occurs relative to the first hinge axis or the second hinge axis.

Another example can include any of the above and/or below examples where the third cam comprises a rotation-determining sub-assembly.

Another example can include any of the above and/or below examples where the third cam comprises sets of opposing cams that operate relative to the first and second axes.

Another example can include any of the above and/or below examples where the first cam and the second cam comprise an angle-specific portion-spacing sub-assembly.

Another example can include a device comprising a first portion that includes a first display and a second portion that includes a second display. The device further comprises a determinative hinge assembly that rotatably secures the first and second portion around first and second hinge axes through a range of rotation and controls rotation around the first hinge axis to a first sub-set of the range of rotation and controls rotation around the second hinge axis to a second sub-set of the range of rotation, and where the determinative hinge assembly forces the first and second portions away from one another during a third sub-set of the rotation that is different than the first and second sub-sets.

Another example can include any of the above and/or below examples where the first sub-set comprises 0 degrees to 90 degrees and 271 degrees to 360 degrees.

Another example can include any of the above and/or below examples where the second sub-set comprises 91 degrees to 270 degrees.

Another example can include any of the above and/or below examples where the third sub-set comprises 45 degrees, 135 degrees, 225 degrees, and/or 315 degrees.

Individual elements of the determinative hinge assembly can be made from various materials, such as metals, plastics, and/or composites. These materials can be prepared in various ways, such as in the form of sheet metals, die cast metals, machined metals, 3D printed materials, molded or 3D printed plastics, and/or molded or 3D printed composites, among others, or any combination of these materials and/or preparations can be employed.

The present determinative hinge assembly concepts can be utilized with any type of device, such as but not limited to notebook computers, tablets, smart phones, wearable smart devices, and/or other types of existing, developing, and/or yet to be developed devices.

Various methods of manufacture, assembly, and use for hinge assemblies and devices are contemplated beyond those shown above relative to FIGS. 1A-12F.

Although techniques, methods, devices, systems, etc., pertaining to determinative hinge assemblies are described in language specific to structural features and/or methodological acts, it is to be understood that the subject matter defined in the appended claims is not limited to the specific features or acts described. Rather, the specific features and acts are disclosed as example forms of implementing the claimed methods, devices, systems, etc.

The invention claimed is:

1. A device, comprising:
a first portion and a second portion; and,
a determinative hinge assembly that rotatably secures the first and second portions through a range of angles of rotation between a closed orientation and an open orientation, the first portion rotating around a first hinge axis and the second portion rotating around a second hinge axis in accordance with sub-sets of the range of angles, the determinative hinge assembly comprising:
a rotation-determining sub-assembly secured to the first portion and the second portion that controls whether the rotation occurs around the first hinge axis or the second hinge axis depending on a current sub-set of the range of angles, and
an angle-specific portion-spacing sub-assembly secured to the first portion and the second portion that forces the first and second portions apart from one another in accordance with particular angles of the rotation.

2. The device of claim 1, wherein the rotation-determining sub-assembly comprises camming elements positioned around the first and second hinge axes.

3. The device of claim 2, wherein the camming elements comprise a first cam positioned around the first hinge axis, a second cam positioned around the second hinge axis, and a follower interposed between the first cam and the second cam.

4. The device of claim 3, wherein the first cam is manifest on a first body that is secured to the first portion with a single degree of freedom orthogonal to the first hinge axis.

5. The device of claim 4, further comprising a biasing element that resiliently biases the first portion toward the first hinge axis along the single degree of freedom.

6. The device of claim 1, wherein the angle-specific portion-spacing sub-assembly comprises a first cam positioned on the first hinge axis and wherein the first portion includes a first cam follower that engages the first cam.

7. The device of claim 6, wherein the first cam comprises alternating high areas and low areas and wherein engagement of the high areas force the first portion away from the first hinge axis.

8. The device of claim 7, wherein the high areas correspond to a multiple of 45 degrees of the angles of rotation within the range.

9. The device of claim 7, wherein the alternating high areas and low areas are arranged in a cloverleaf arrangement.

10. The device of claim 7, wherein the angle-specific portion-spacing sub-assembly further comprises a second cam positioned on the second hinge axis and wherein the second portion includes a second cam follower that engages the second cam.

11. The device of claim 1, wherein the sub-sets comprise a multiple of 90 degrees of the angles of rotation within the range, and wherein the particular angles comprise oblique angles within the range.

12. The device of claim 1, wherein the rotation-determining sub-assembly resiliently biases the first portion toward the first hinge axis and resiliently biases the second portion toward the second hinge axis, and wherein the angle-specific portion-spacing sub-assembly overcomes the resilient bias and forces either the first portion away from the first hinge axis or the second portion away from the second hinge axis at individual oblique angles within the range.

13. A device, comprising:
a first portion that rotates about a first hinge axis and is resiliently biased by a first biasing element toward the first hinge axis;
a second portion that rotates about a second hinge axis and is resiliently biased by a second biasing element toward the second hinge axis, wherein the first and second portions rotate about the first and second hinge axes through a range of angles between closed and open positions of the device;
a first pair of camming elements that operate relative to the first hinge axis and are slidably secured to the first portion; and,
a second pair of camming elements that operate relative to the second hinge axis and are slidably secured to the second portion, wherein when the first and second portions are oriented at an acute angle within the range, the second pair of camming elements overcome the resilient bias and force the second portion away from the second hinge axis while the first pair of camming elements allow the first portion to remain biased toward the first hinge axis, and wherein when the first and second portions are oriented at an obtuse angle within the range, the first pair of camming elements overcome the resilient bias and force the first portion away from the first hinge axis while the second pair of camming elements allow the second portion to be biased back toward the second hinge axis.

14. The device of claim 13, further comprising a third pair of camming elements that control whether rotation at individual angles occurs relative to the first hinge axis or the second hinge axis.

15. The device of claim 14, wherein the third pair of camming elements comprise a rotation-determining sub-assembly.

16. The device of claim 14, wherein the third pair of camming elements comprise a set of an opposing cam and cam follower that operates relative to the first and second hinge axes.

17. The device of claim 14, wherein the first pair of camming elements and the second pair of camming elements comprise an angle-specific portion-spacing sub-assembly.

18. A device, comprising:
a first portion that includes a first display and a second portion that includes a second display; and,
a determinative hinge assembly that rotatably secures the first and second portions through a range of angles of rotation between a closed orientation and an open orientation of the device, the determinative hinge assembly controlling rotation of the first portion around a first hinge axis in a corresponding first sub-set of the range of rotation and controlling rotation of the second portion around a second hinge axis in a corresponding second sub-set of the range of angles of rotation, and wherein the determinative hinge assembly forces the first and second portions away from one another during a third sub-set of the range of angels of rotation that is different than the first and second sub-sets.

19. The device of claim 18, wherein the first sub-set comprises 0 degrees to 90 degrees and 271 degrees to 360 degrees.

20. The device of claim 18, wherein the second sub-set comprises 91 degrees to 270 degrees.

21. A device, comprising:
a first portion defining a first hinge axis and a second portion defining a second hinge axis; and,
a hinge assembly that rotatably secures the first and second portions through a range of angles of rotation between a closed orientation and an open orientation, the first portion rotating around the first hinge axis and the second portion rotating around the second hinge axis in accordance with sub-sets of the range of angles, the hinge assembly comprising:
a first cam and cam follower pair positioned around the first hinge axis and a second cam and cam follower pair positioned around the second hinge axis, the first and second cam and cam follower pairs configured to control whether the rotation occurs around the first hinge axis or the second hinge axis depending on a current sub-set of the range of angles, and
a first additional cam and cam follower pair positioned relative to the first portion and a second additional cam and cam follower pair positioned relative to the second portion, the first and second additional cam and cam follower pairs configured to force the first and second portions apart from one another in accordance with particular angles of the rotation.

22. The device of claim 21, wherein the first and second additional cam and cam follower pairs are configured to prevent the first portion from contacting the second portion at the particular angles of the rotation of the first portion relative to the second portion.

23. The device of claim 22, wherein the particular angles of the rotation of the first portion relative to the second portion include 45 degrees.

* * * * *